(12) United States Patent
Kurita et al.

(10) Patent No.: US 11,336,849 B2
(45) Date of Patent: May 17, 2022

(54) IMAGE PROCESSING APPARATUS AND IMAGE PROCESSING METHOD

(71) Applicant: SONY CORPORATION, Tokyo (JP)

(72) Inventors: Teppei Kurita, Tokyo (JP); Shun Kaizu, Kanagawa (JP); Yuhi Kondo, Tokyo (JP); Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 493 days.

(21) Appl. No.: 16/324,937

(22) PCT Filed: Jun. 13, 2017

(86) PCT No.: PCT/JP2017/021792
§ 371 (c)(1),
(2) Date: Feb. 12, 2019

(87) PCT Pub. No.: WO2018/042815
PCT Pub. Date: Mar. 8, 2018

(65) Prior Publication Data
US 2021/0281786 A1   Sep. 9, 2021

(30) Foreign Application Priority Data
Aug. 31, 2016  (JP) .............................. JP2016-169271

(51) Int. Cl.
*H04N 5/367* (2011.01)
*H04N 5/355* (2011.01)
(Continued)

(52) U.S. Cl.
CPC ............. *H04N 5/367* (2013.01); *H04N 5/355* (2013.01); *H04N 5/372* (2013.01); *H04N 5/374* (2013.01); *H04N 17/002* (2013.01)

(58) Field of Classification Search
CPC ........ H04N 5/367; H04N 5/355; H04N 5/372; H04N 5/374; H04N 17/002
See application file for complete search history.

(56) References Cited

U.S. PATENT DOCUMENTS 8,654,246 B2 * 2/2014 Kanamori .......... H04N 5/23229
                                                    348/370
9,691,802 B2 * 6/2017 Sambongi ................ G06K 9/52
(Continued)

FOREIGN PATENT DOCUMENTS

CN   101584222 A   11/2009
CN   102316329 A   1/2012
(Continued)

OTHER PUBLICATIONS

Extended European Search Report of EP Application No. 17845826.1, dated Jul. 1, 2019, 09 pages.
(Continued)

*Primary Examiner* — Ahmed A Berhan
(74) *Attorney, Agent, or Firm* — Chip Law Group

(57) ABSTRACT

A polarization imaging section 20 includes polarized pixels in each of a plurality of polarization directions. The polarization imaging section 20 includes a polarizer. The polarization imaging section 20 outputs image signals of a polarized image to a defect detecting section 35 of an image processing section 30. In a case where a difference between a pixel value of a target polarized pixel generated by the polarization imaging section and a pixel value of the target polarized pixel estimated from polarization characteristics corresponding to pixel values of peripheral pixels in a polarization direction different from a polarization direction of the target polarized pixel is greater than a predetermined allowable range, the defect detecting section 35 determines that the target polarized pixel is a defective pixel. Therefore, (Continued)

it is possible to detect a defect of a pixel in the polarization imaging section that generates the polarized image.

16 Claims, 22 Drawing Sheets

(51) Int. Cl.
    *H04N 5/372*           (2011.01)
    *H04N 5/374*           (2011.01)
    *H04N 17/00*           (2006.01)

(56) References Cited

U.S. PATENT DOCUMENTS

| | | |
|---|---|---|
| 2009/0290039 A1 | 11/2009 | Kanamori et al. |
| 2011/0235775 A1 | 9/2011 | Tada |
| 2016/0163752 A1 | 6/2016 | Sambongi et al. |
| 2017/0257584 A1 | 9/2017 | Fujita |
| 2018/0204882 A1 | 7/2018 | Segawa et al. |

FOREIGN PATENT DOCUMENTS

| | | |
|---|---|---|
| EP | 2034743 A1 | 3/2009 |
| JP | 09-065378 A | 3/1997 |
| JP | 2001-144730 A | 5/2001 |
| JP | 2001-197372 A | 7/2001 |
| JP | 2002-223391 | 8/2002 |
| JP | 2002-223391 A | 8/2002 |
| JP | 2003-298947 A | 10/2003 |
| JP | 2008-067158 | 3/2008 |
| JP | 2008-067158 A | 3/2008 |
| JP | 4235252 B2 | 3/2009 |
| JP | 2010-028488 A | 2/2010 |
| JP | 2011-114473 A | 6/2011 |
| JP | 4787871 B2 | 10/2011 |
| JP | 2011-223545 A | 11/2011 |
| JP | 4895107 B2 | 3/2012 |
| JP | 2015-041793 A | 3/2015 |
| JP | 2016-048815 A | 4/2016 |
| JP | 2017-038011 A | 2/2017 |
| TW | 201711176 A | 3/2017 |
| WO | 2008/149489 A1 | 12/2008 |
| WO | 2015/025676 A1 | 2/2015 |
| WO | 2016/031597 A1 | 3/2016 |
| WO | 2017/026385 A1 | 2/2017 |

OTHER PUBLICATIONS

Ratliff, et al., "Dead pixel replacement in LWIR microgrid polarimeters", Optics Express, XP055598409, vol. 15, No. 12, Jun. 11, 2007, pp. 7596-7609.

International Search Report and Written Opinion of PCT Application No. PCT/JP2017/021792, dated Sep. 5, 2017, 06 pages of ISRWO.

Office Action for JP Patent Application No. 2018-536962, dated Jul. 27, 2021, 10 pages of English Translation and 20 pages of Office Action.

* cited by examiner

FIG. 3

| C1 | C2 | C1 |
| --- | --- | --- |
| C4 | C3 | C4 |
| C1 | C2 | C1 |

C1 (POLARIZATION DIRECTION 0°)
C2 (POLARIZATION DIRECTION 45°)
C3 (POLARIZATION DIRECTION 90°)
C4 (POLARIZATION DIRECTION 135°)

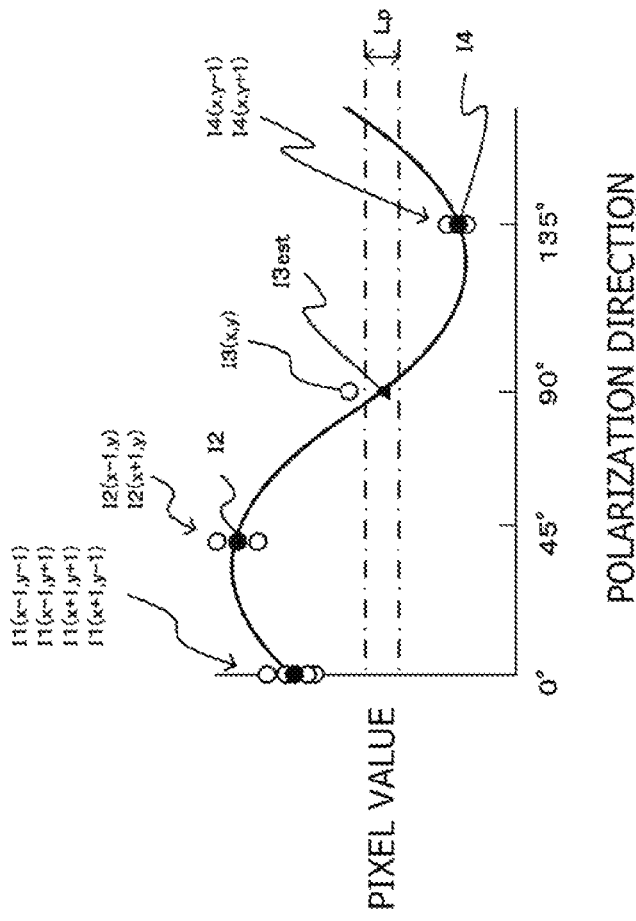

FIG. 9

| C3 | C2 | C3 (x,y-2) | C2 | C3 |
|---|---|---|---|---|
| C4 | C1 (x-1,y-1) | C4 (x,y-1) | C1 (x+1,y-1) | C4 |
| C3 (x-2,y) | C2 (x-1,y) | C3 (x,y) | C2 (x+1,y) | C3 (x+2,y) |
| C4 | C1 (x-1,y+1) | C4 (x,y+1) | C1 (x+1,y+1) | C4 |
| C3 | C2 | C3 (x,y+2) | C2 | C3 |

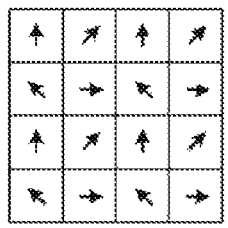 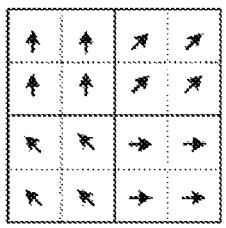 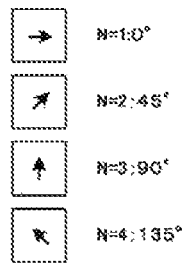
FIG. 19A    FIG. 19B
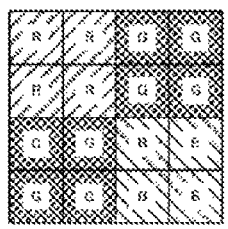 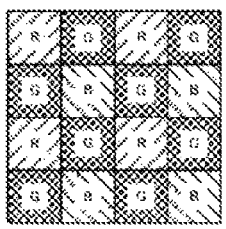
FIG. 19C    FIG. 19D
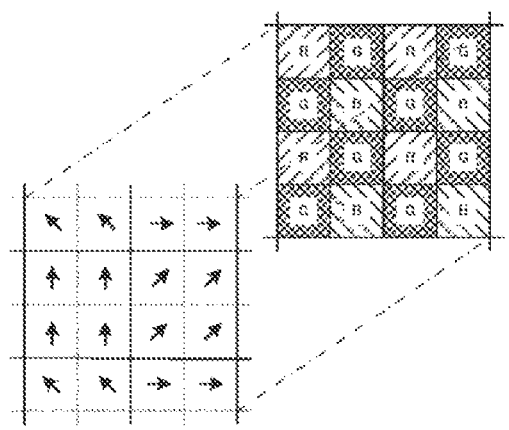 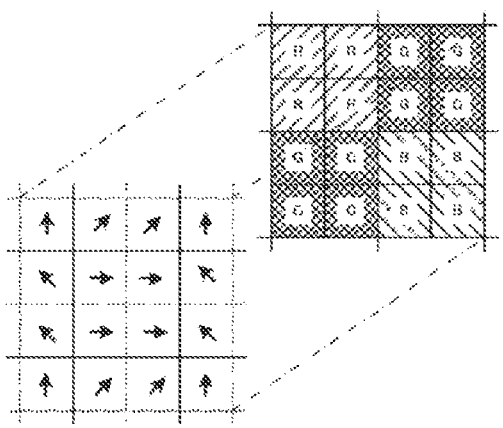
FIG. 19E    FIG. 19F

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/021792 filed on Jun. 13, 2017, which claims priority benefit of Japanese Patent Application No. JP 2016-169271 filed in the Japan Patent Office on Aug. 31, 2016. Each of the above-referenced applications is hereby incorporated herein by reference in its entirety.

TECHNICAL FIELD

The present technology relates to an image processing apparatus and an image processing method that allow detection of a defect of a polarization imaging device.

BACKGROUND ART

Conventionally, since a pixel defect occurs in a charge coupled device (CCD) imaging device or a complementary metal oxide semiconductor (CMOS) imaging device, processing has been performed to detect and correct the pixel defect. For example, in PTL 1, pixels that are in the vicinity of a target pixel and that have a color identical to the target pixel are used as comparison pixels. The number of comparison pixels with absolute difference values greater than a first threshold value is detected. Each of the absolute difference values is a difference between the target pixel and a corresponding one of the comparison pixels. In a case where the number of comparison pixels detected is greater than a second threshold value, the target pixel is determined as a defective pixel. Further, in PTL 2, in a case where a difference between a signal output level of a predetermined pixel and a signal output level of each of a plurality of pixels on the periphery of the predetermined pixel is greater than a defect detection threshold value, the predetermined pixel is determined to be a defective pixel.

CITATION LIST

Patent Literature

[PTL 1]
Japanese Patent Laid-Open No. 2008-067158
[PTL 2]
Japanese Patent Laid-Open No. 2002-223391

SUMMARY

Technical Problem

Incidentally, the defective pixel determination as described above does not take into consideration the use of a polarization imaging device in which polarizers in different polarization directions are provided on an incident surface in a pixel unit or in a unit of a plurality of pixels.

In light of the foregoing, it is an object of the present technology to provide an image processing apparatus and an image processing method that allow defect detection of a polarization imaging device.

Solution to Problem

According to a first aspect of the present technology, an image processing apparatus includes a defect detecting section configured to detect whether a target polarized pixel is a defective pixel using a pixel value of the target polarized pixel generated by a polarization imaging section and a pixel value of the target polarized pixel estimated from polarization characteristics corresponding to pixel values of peripheral pixels in a polarization direction different from a polarization direction of the target polarized pixel, the polarization imaging section being configured to obtain polarized pixels in a plurality of polarization directions.

According to the present technology, the defect detecting section estimates the pixel value of the target polarized pixel from the polarization characteristics corresponding to the pixel values of the peripheral pixels in the polarization direction different from the polarization direction of the target polarized pixel generated by the polarization imaging section that includes a polarizer. The polarization imaging section includes the polarized pixels in each of the plurality of polarization directions. In a case where a difference between the pixel value of the target polarized pixel and the pixel value estimated is out of a predetermined allowable range, the defect detecting section determines that the target polarized pixel is the defective pixel.

Further, the peripheral pixels may be in the polarization direction different from the polarization direction of the target polarized pixel. In a case where the peripheral pixels include a plurality of pixels in an identical polarization direction, the defect detecting section may switch a pixel to be selected from the plurality of pixels in the identical polarization direction. In this manner, the defect detecting section may create a plurality of combinations of the peripheral pixels used for estimation of the pixel value of the target polarized pixel and estimate the pixel value of the target polarized pixel for each combination. In a case where a ratio of combinations with which a difference between the pixel value of the target polarized pixel and the pixel value estimated is out of the predetermined allowable range is greater than a predetermined ratio set in advance, the target polarized pixel may be determined as the defective pixel.

Further, the defect detecting section may detect whether the target polarized pixel is the defective pixel using not only the pixel value of the target polarized pixel but also pixel values of peripheral pixels in an identical polarization direction to the target polarized pixel. In this case, in a case where a difference between the pixel value of the target polarized pixel and the pixel value estimated is out of a predetermined first allowable range and a difference between the pixel value of the target polarized pixel and the pixel values of the peripheral pixels in the identical polarization direction is out of a predetermined second allowable range, the defect detecting section determines that the target polarized pixel is the defective pixel. Further, in a case where a difference between the pixel value of the target polarized pixel and the pixel value estimated is out of the predetermined first allowable range and in a case where the difference is within the predetermined first allowable range and a difference between the pixel value of the target polarized pixel and the pixel values of the peripheral pixels in the identical polarization direction is out of the predetermined second allowable range, the defect detecting section may determine that the target polarized pixel is the defective pixel.

Further, the defect detecting section estimates the pixel value of the target polarized pixel on the basis of polarization characteristics corresponding to pixel values of peripheral pixels that include pixels having an identical color component to the target polarized pixel and that are in a polarization direction different from the polarization direction of the target polarized pixel. Further, a white balance adjusting section is included. The white balance adjusting section equalizes pixel values for each color component, the pixel values being generated by imaging a white object. The defect detecting section may estimate the pixel value of the target polarized pixel using pixel values of peripheral pixels in a different polarization direction from the polarization direction of the target polarized pixel among pixel values of respective pixels, the pixel values being adjusted for each color component by the white balance adjusting section, the pixel values being generated by imaging the white object.

In addition, the defect detecting section may include, in the pixel values of the peripheral pixels, pixel values of peripheral pixels in a different time direction. Further, in a case where a defect information storage section configured to store defect information indicating the defective pixel is included, the defect detecting section updates the defect information on the basis of a result of defect detection of the target polarized pixel.

The peripheral pixels include pixels in at least two or more polarization directions different from the polarization direction of the target polarized pixel. Further, the peripheral pixels may include non-polarized pixels and pixels in one polarization direction different from the polarization direction of the target polarized pixel. In this case, an angle difference between the polarization direction of the target polarized pixel and the polarization direction of the peripheral pixels is within a predetermined range based on 45°.

Further, a defect correcting section configured to specify, as a corrected pixel value of the defective pixel, a pixel value estimated on the basis of the polarization characteristics corresponding to the pixel values of the peripheral pixels in the polarization direction different from a polarization direction of the defective pixel, or a defect correcting section configured to calculate a corrected pixel value of the defective pixel using pixel values of peripheral pixels determined to be in a polarization direction identical to the polarization direction of the defective pixel and to have a texture identical to a texture of the defective pixel, may be included. The defect correcting section specifies, as a pixel value of the defective pixel, an average value of pixel values of peripheral pixels in a polarization direction identical to a polarization direction of the defective pixel and that have a texture identical to a texture of the defective pixel, for example.

According to a second aspect of the present technology, an image processing method includes detecting, by a defect detecting section, whether a target polarized pixel is a defective pixel using a pixel value of the target polarized pixel generated by a polarization imaging section and a pixel value of the target polarized pixel estimated from polarization characteristics corresponding to pixel values of peripheral pixels in a polarization direction different from a polarization direction of the target polarized pixel, the polarization imaging section being configured to obtain polarized pixels in a plurality of polarization directions.

Advantageous Effects of Invention

According to the present technology, whether a target polarized pixel is a defective pixel is detected using a pixel value of the target polarized pixel generated by a polarization imaging section and a pixel value of the target polarized pixel estimated from polarization characteristics corresponding to pixel values of peripheral pixels in a polarization direction different from a polarization direction of the target polarized pixel. The polarization imaging section obtains polarized pixels in a plurality of polarization directions. Therefore, it is possible to detect a defect of a pixel in the polarization imaging section that generates a polarized image.

It is noted that the effects described in the present specification are merely examples and are not limited to those examples. Further, additional effects may be exhibited.

BRIEF DESCRIPTION OF DRAWINGS

FIG. 3 is a diagram of assistance in explaining an operation of an image processing apparatus.

FIGS. 7A and 7B depicts diagrams of assistance in explaining a defect determining operation of the defect detecting section according to a first embodiment.

FIG. 9 is a diagram of assistance in explaining a defect determining operation of the defect detecting section according to a third embodiment.

FIG. 14 is a diagram depicting S.

FIGS. 19A, 19B, 19C, 19D, 19E, and 19F depict diagrams illustrating other configurations and combinations of a polarizer and a color filter.

DESCRIPTION OF EMBODIMENTS

Hereinafter, embodiments of the present technology will be described. It is noted that description will be made in the following order.

1. About Polarized Image and Image Processing Apparatus
2. Embodiments of Image Processing Apparatus
2-1. First Embodiment
2-2. Second Embodiment
2-3. Third Embodiment
2-4. Fourth Embodiment
2-5. Fifth Embodiment
2-6. Sixth Embodiment
2-7. Seventh Embodiment
2-8. Eighth Embodiment
2-9. Ninth Embodiment
2-10. Tenth Embodiment
2-11. Other Embodiments
3. Application Examples

1. About Polarized Image and Image Processing Apparatus

Figure 1:
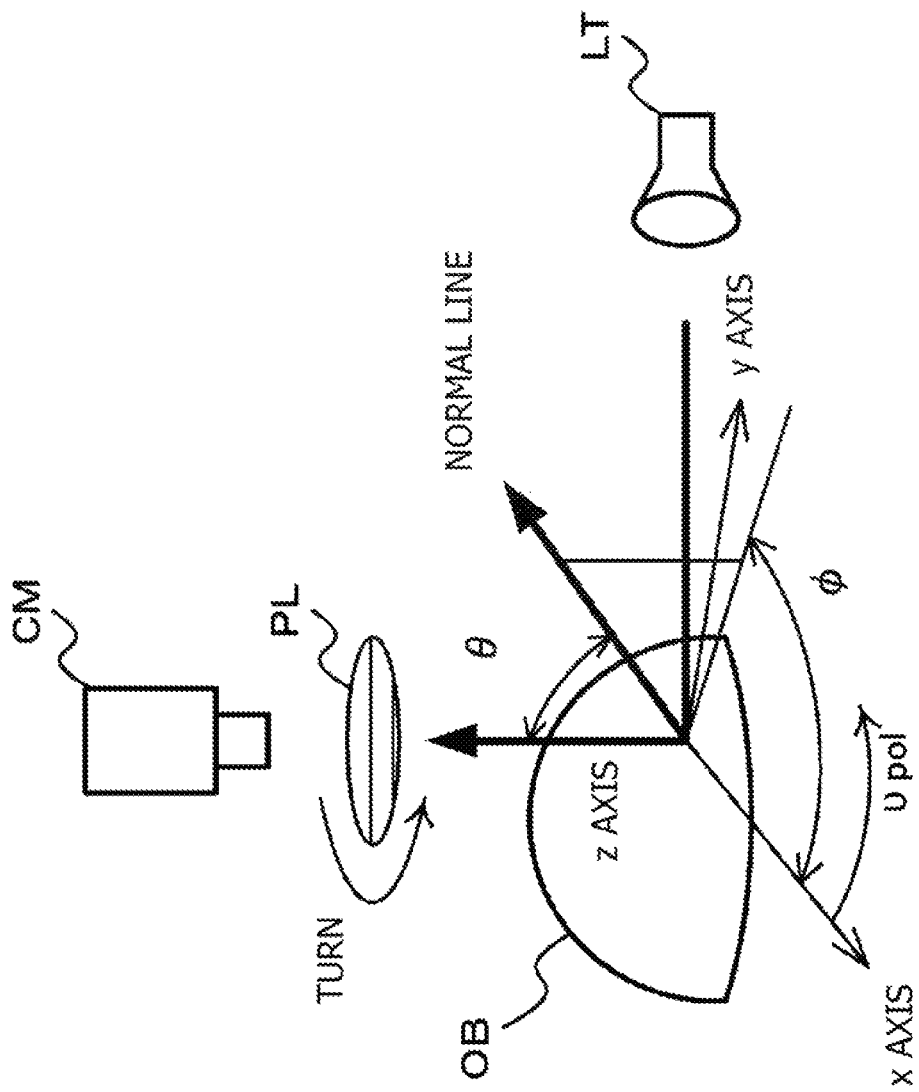
FIG. 1 is a diagram of assistance in explaining generation of a polarized image.

FIG. 1 is a diagram of assistance in explaining generation of a polarized image. For example, as depicted in FIG. 1, a light source LT is used to illuminate an object OB, and an imaging section CM images the object OB through a polarizer PL. In this case, the luminance of the object OB in the captured image changes according to a polarization direction of the polarizer PL. It is noted that for ease of description, the highest luminance is assumed to be Imax, and the lowest luminance is assumed to be Imin when the polarization direction is turned, for example. Further, the x-axis and the y-axis in the two-dimensional coordinates are assumed to be on a plane of the polarizer. In this case, an angle in the y-axis direction with respect to the x-axis when the polarization direction of the polarizer is turned will be assumed to be a polarization angle upol. In FIG. 1, an angle θ is a zenith angle.

Figure 2:
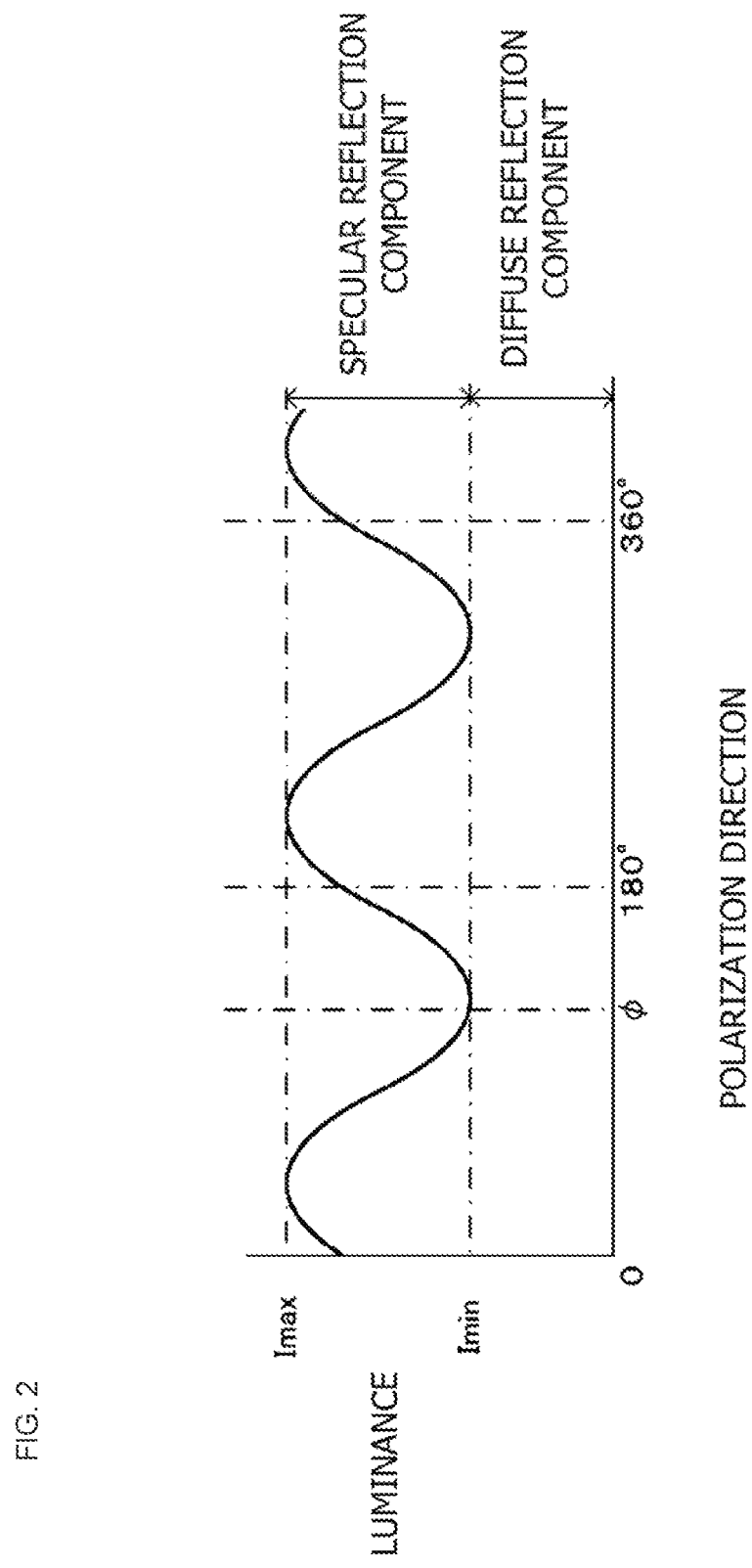
FIG. 2 is a diagram illustrating a relationship between luminance and polarization angles.

When the polarization direction of the polarizer is turned 180 degrees about a z axis direction, the polarization direction of the polarizer returns to its original polarization state. The polarization direction has a cycle of 180 degrees. Further, luminance I observed when the polarization direction is turned can be expressed as a formula (1). It is noted that FIG. 2 illustrates a relationship between the luminance and polarization directions.

[Math. 1]

$$I_{pol} = \frac{I_{max} + I_{min}}{2} + \frac{I_{max} - I_{min}}{2} \cos 2(v_{pol} - \phi) \quad (1)$$

In the formula (1), the polarization angle upol is known at the time of generation of a polarized image, while the maximum luminance Imax, the minimum luminance Imin, and an azimuth φ are variables. Therefore, fitting to a polarization model formula indicated in the formula (1) is performed using the luminance of a polarized image with three or more polarization directions. This allows the luminance of a desired polarization direction φ to be estimated on the basis of the polarization model formula indicating a relationship between the luminance and the polarization direction.

An image processing apparatus performs fitting to the polarization model formula using peripheral pixels in different polarization directions that are on the periphery of a target polarized pixel. This allows the image processing apparatus to estimate a pixel value of the target polarized pixel. Further, the image processing apparatus uses the pixel value of the target polarized pixel and the estimated pixel value to perform defect detection of whether the target polarized pixel is a defective pixel, and perform defect correction in a case where the target polarized pixel has been determined to be the defective pixel. It is noted that in the following description, a polarized pixel in each of four polarization directions is indicated as a CN (N=1 to 4) using a variable N indicating a polarization direction.

FIG. 3 is a diagram of assistance in explaining an operation of the image processing apparatus. A target polarized pixel C3 has a pixel value I3 with the polarization direction N=3. A peripheral pixel C1 has a pixel value I1 with the polarization direction N=1. A peripheral pixel C2 has a pixel value I2 with the polarization direction N=2. A peripheral pixel C4 has a pixel value I4 with the polarization direction N=4. In this case, the image processing apparatus can perform fitting to the polarization model formula on the basis of the peripheral pixels and calculate an estimated pixel value I3est of the target polarized pixel C3 from the polarization model formula after fitting. In a case where the pixel value I3 of the target polarized pixel C3 exceeds an allowable range Lp based on the estimated pixel value I3est, the image processing apparatus determines that the target polarized pixel C3 is the defective pixel. Further, in a case where the polarization direction N=1 is 0°, N=2 is 45°, N=3 is 90°, and N=4 is 135°, a formula (2) holds in an ideal state. The formula (2) is transformed into a formula (3).

$$(I2+I4)/2=(I1+I3)/2 \quad (2)$$

$$I3est=(I2+I4)-I1 \quad (3)$$

Therefore, in a case where the target polarized pixel C3 has been determined to be the defective pixel, the image processing apparatus uses the formula (3) as a prediction formula to perform the defect correction and specifies, as a corrected pixel value I3c, the estimated pixel value I3est calculated on the basis of the pixel values I1, I2, and I4 of the respective peripheral pixels C1, C2, and C4.

It is noted that in a case where the target polarized pixel is the pixel C1, the image processing apparatus performs the defect correction using a formula (4) as a prediction formula and specifies, as a corrected pixel value, an estimated pixel value I1est calculated on the basis of the pixel values of the peripheral pixels in different polarization directions. In a case where the target polarized pixel is the pixel C2, the image processing apparatus performs the defect correction using a formula (5) as a prediction formula and specifies, as a corrected pixel value, an estimated pixel value I2est calculated on the basis of the pixel values of the peripheral pixels in different polarization directions. In a case where the target polarized pixel is the pixel C4, the image processing apparatus performs the defect correction using a formula (6) as a prediction formula and specifies, as a corrected pixel value, an estimated pixel value I4est calculated on the basis of the pixel values of the peripheral pixels in different polarization directions.

$$I1est=(I2+I4)-I3 \quad (4)$$

$$I2est=(I1+I3)-I4 \quad (5)$$

$$I4est=(I1+I3)-I2 \quad (6)$$

Further, the image processing apparatus may correct the defective pixel using the pixel values of the peripheral pixels in an identical polarization direction to the polarization direction of the defective pixel.

2. Embodiments of Image Processing Apparatus

Figure 4:
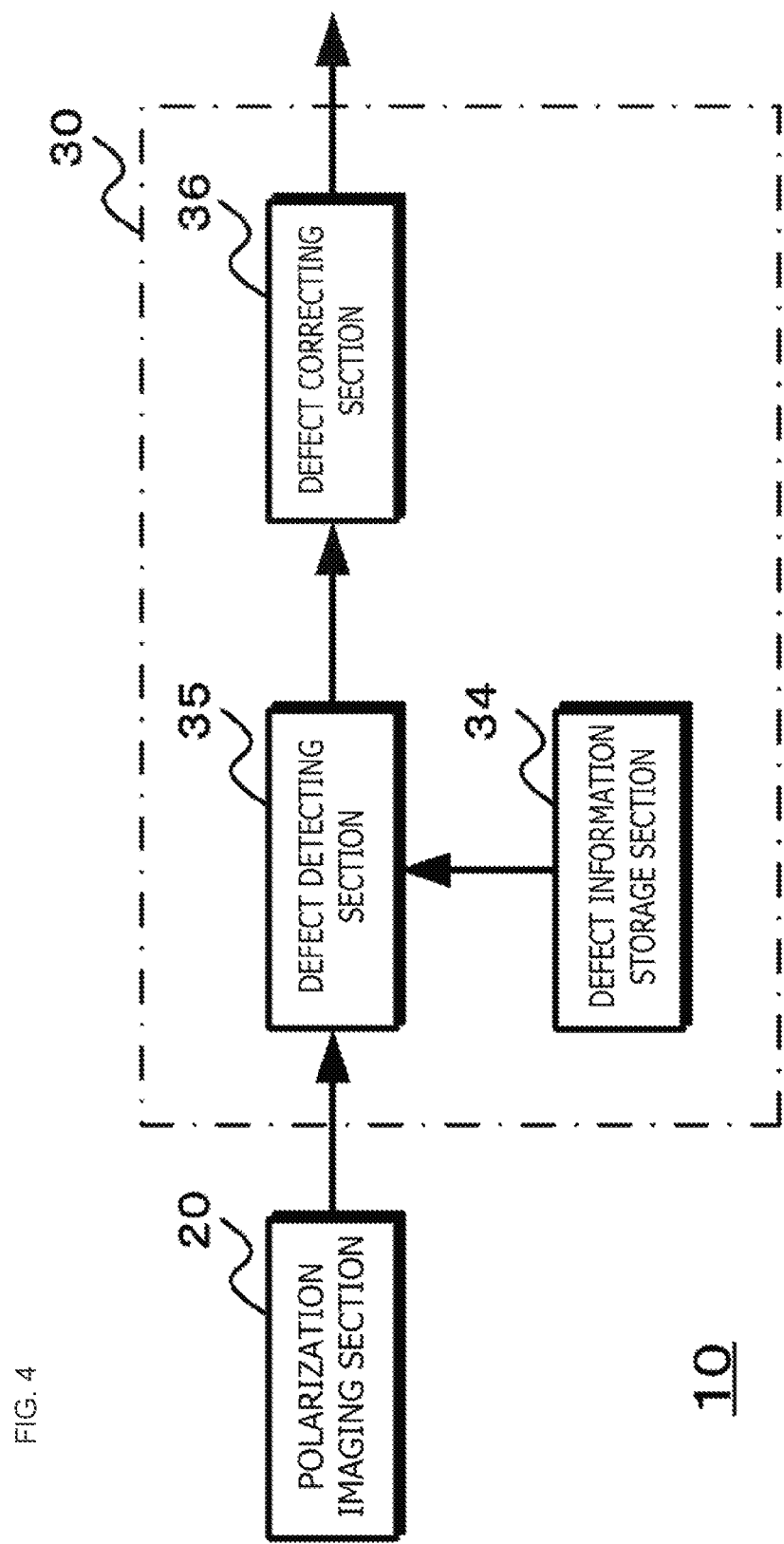
FIG. 4 is a diagram illustrating a configuration of a polarized image system using the image processing apparatus.

Next, embodiments of the image processing apparatus will be described. FIG. 4 illustrates a configuration of a polarized image system using the image processing apparatus. A polarized image system 10 includes a polarization imaging section 20 and an image processing section 30. The image processing section 30 corresponds to the image processing apparatus according to the present technology.

The image processing section 30 includes a defect detecting section 35, a defect information storage section 34, and a defect correcting section 36. The image processing section 30 detects and corrects a defect of a polarized RAW image generated by the polarization imaging section 20. The polarization imaging section 20 includes a polarizer. The polarized RAW image includes polarized pixels in each of a plurality of polarization directions. It is noted that the image processing section 30 may include either one of the defect detecting section 35 and the defect correcting section 36, and the defect information storage section 34 may be provided separately from the image processing section 30.

In the first to seventh embodiments, description will be made with regard to a case where the polarized image is a black and white image. Further, in the eighth and ninth embodiments, description will be made with regard to a case where the polarized image is a color image. In addition, in the tenth embodiment, description will be made with regard to a case where the polarization directions of the polarized image are two directions.

2-1. First Embodiment

Figure 5:
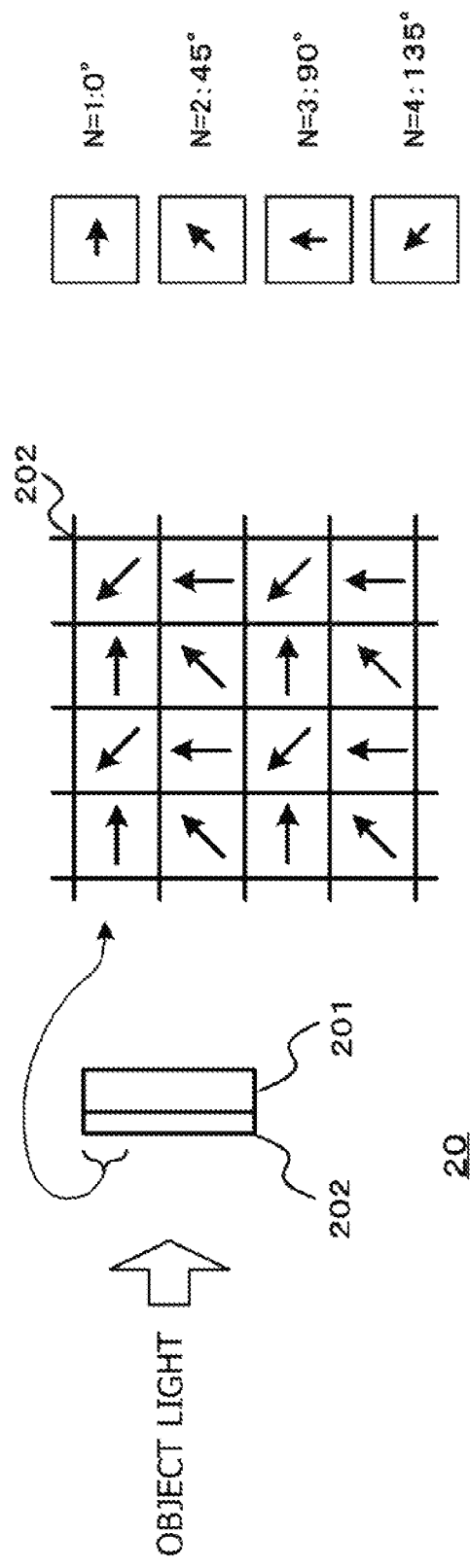
FIG. 5 is a diagram illustrating a configuration of a polarization imaging section that generates a black and white polarized image.

FIG. 5 illustrates a configuration of the polarization imaging section that generates a black and white polarized image. The polarization imaging section 20 includes: an image sensor 201 such as a complementary metal oxide semiconductor (CMOS) and a charge coupled device (CCD); and a polarizer 202. The image sensor 201 performs photoelectric conversion on object light that has been incident through the polarizer 202 and generates image signals according to the object light, that is, RAW image signals of a black and white polarized image. The polarization imaging section 20 outputs the RAW image signals of the black and white polarized image to the image processing section 30.

It is sufficient if the polarizer 202 can extract linearly polarized light from the object light. For example, a wire grid, a photonic liquid crystal, or the like is used for the polarizer 202. The polarizer 202 illustrated uses a polarization component unit as a pixel unit, and includes pixels in a plurality of polarization directions (e.g., four directions of 0°, 45°, 90°, and 135°) so as to satisfy the conditions of fitting to the polarization model formula and holding the prediction formula.

The defect detecting section 35 of the image processing section 30 detects whether the target polarized pixel in a black and white polarized RAW image (hereinafter referred to as "polarized image") generated by the polarization imaging section 20 is the defective pixel. Further, the defect detecting section 35 may perform the defect detection to detect whether the target polarized pixel has been changed to the defective pixel in a case where it is indicated on the basis of defect information stored in the defect information storage section 34 that the target polarized pixel is not the defective pixel. The defect detecting section 35 estimates the pixel value of the target polarized pixel on the basis of the polarization model formula after fitting that indicates polarization characteristics corresponding to the pixel values of peripheral pixels in different polarization directions. On the basis of the pixel value of the target polarized pixel and the estimated pixel value (hereinafter referred to as "estimated pixel value"), the defect detecting section 35 determines whether the target polarized pixel is the defective pixel. For example, in a case where the difference between the pixel value of the target polarized pixel and the estimated pixel value is out of a predetermined allowable range, the defect detecting section 35 determines that the target polarized pixel is the defective pixel. In a case where the defect detecting section 35 has determined that the target polarized pixel is the defective pixel, the defect detecting section 35 outputs, to the defect correcting section 36, information indicating that the target polarized pixel is the defective pixel, in addition to the defect information obtained from the defect information storage section 34. At this time, the defect detecting section 35 also outputs the polarized image to the defect correcting section 36.

On the basis of the polarized image and the defect information supplied from the defect detecting section 35, the defect correcting section 36 corrects the defective pixel of the polarized image indicated by the defect information using the peripheral pixels positioned in the periphery of the defective pixel.

Figure 6:
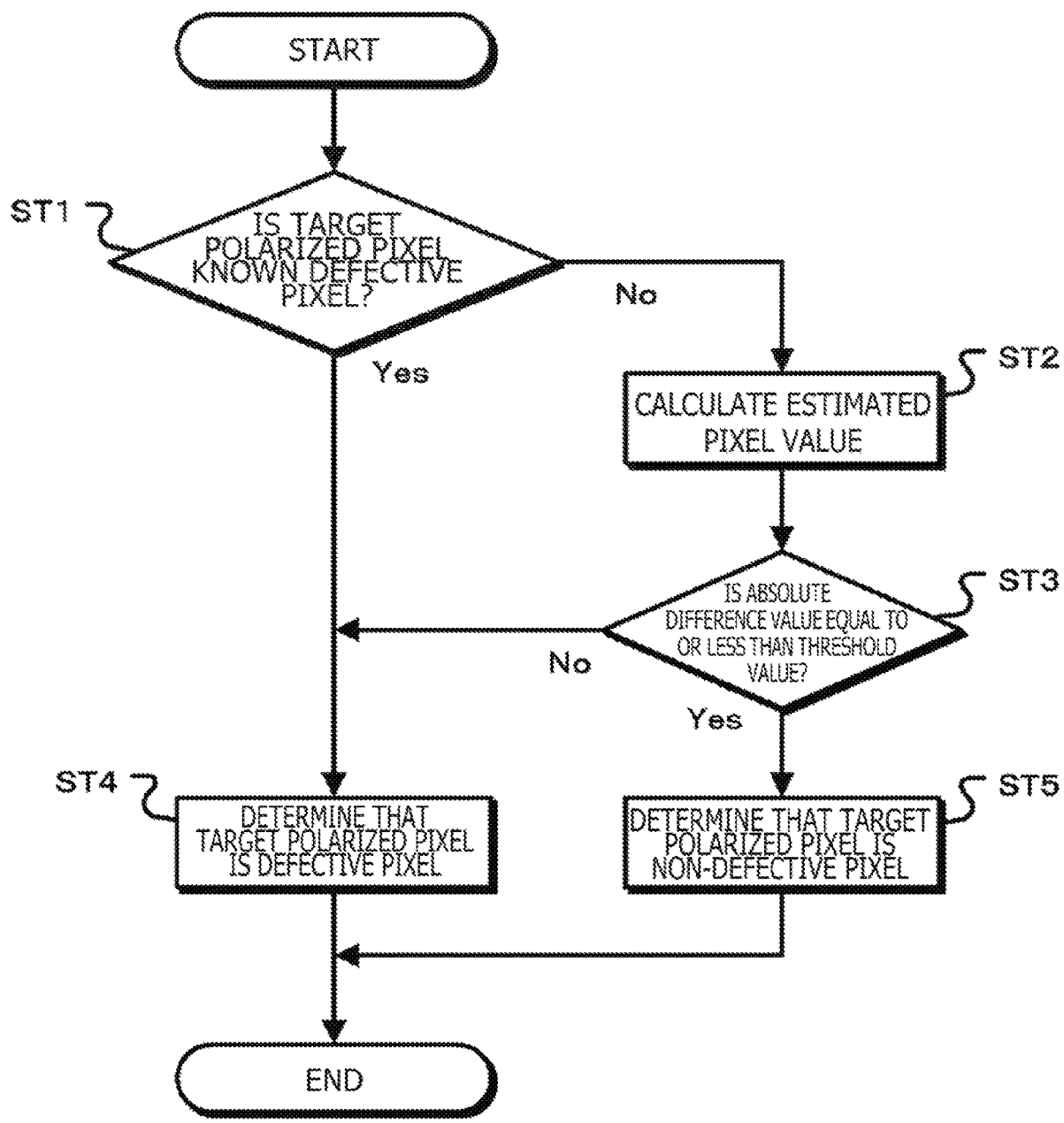
FIG. 6 is a flowchart illustrating an operation of a defect detecting section.

Next, an operation of the defect detecting section 35 will be described. FIG. 6 is a flowchart illustrating the operation of the defect detecting section. In step ST1, the defect detecting section determines whether the target polarized pixel is a known defective pixel. In a case where defect information stored in the defect information storage section 34 indicates that the target polarized pixel is the defective pixel, the defect detecting section 35 determines that the target polarized pixel is the known defective pixel and proceeds to step ST4. Further, in a case where the defect information does not indicate that the target polarized pixel is the defective pixel, the defect detecting section 35 proceeds to step ST2.

In step ST2, the defect detecting section calculates an estimated pixel value of the target polarized pixel. The defect detecting section 35 calculates the estimated pixel value using peripheral pixels that are in polarization directions different from the polarization direction of the target polarized pixel and that are positioned in the periphery of the defective pixel of the target polarized pixel, and proceeds to step ST3. It is noted that calculation of the estimated pixel value will be described later.

In step ST3, the defect detecting section determines whether an absolute difference value is equal to or less than a threshold value. The defect detecting section 35 calculates the absolute difference value between the pixel value of the target polarized pixel and the estimated pixel value calculated in step ST3. In a case where the absolute difference value is greater than the threshold value, the defect detecting section 35 proceeds to step ST4. In a case where the absolute difference value is equal to or less than the threshold value, the defect detecting section 35 proceeds to step ST5.

In step ST4, the defect detecting section determines that the target polarized pixel is the defective pixel. Since the target polarized pixel is the known defective pixel or the absolute difference value with the estimated pixel value is greater than the threshold value, the defect detecting section 35 determines that the target polarized pixel is the defective pixel.

In step ST5, the defect detecting section determines that the target polarized pixel is a non-defective pixel. Since the target polarized pixel is not the known defective pixel and the absolute difference value with the estimated pixel value is equal to or less than the threshold value, the defect detecting section 35 determines that the target polarized pixel is the non-defective pixel.

Next, description will be made with regard to an operation of calculating the estimated pixel value and a defect determining operation of the defect detecting section. The defect detecting section 35 calculates the estimated pixel value of the target polarized pixel using the pixel values of the peripheral pixels in the periphery of the target polarized pixel. In a case where a region of the peripheral pixels used for calculating the estimated pixel value is widened, resistance to noise can be improved because the estimated pixel value is calculated using pixel values of a number of polarized pixels. However, widening the region of the peripheral pixels is more likely to include a pixel in different texture from the target polarized pixel. In a case where the pixel in different texture is included in the peripheral pixels, it is not possible to obtain the correct estimated pixel value. Therefore, the defect detecting section 35 calculates the estimated pixel value using the peripheral pixels within a region size. The region size is predetermined such that the resistance to noise is high while influence of texture different from the target polarized pixel is small.

FIGS. 7A and 7B depict diagrams of assistance in explaining the defect determining operation of the defect detecting section according to the first embodiment. FIG. 7A depicts a target polarized pixel subjected to the defect detection and peripheral pixels. The defect detecting section 35 calculates the estimated pixel value using the pixel values of the peripheral pixels in a 3×3 pixel region (peripheral pixel region) around a target polarized pixel C3(x, y). In a case where the polarization direction of the target polarized pixel C3 is 90°, the polarization directions of peripheral pixels C1(x−1, y−1), C1(x−1, y+1), C1(x+1, y+1), and C1(x+1, y−1) are 0°, the polarization directions of peripheral pixels C2(x−1, y) and C2(x+1, y) are 45°, and the polarization directions of peripheral pixels C4(x, y−1) and C4(x, y+1) are 135°, the formula (3) described above holds in the ideal state. Further, in the first embodiment, each of the pixel values I1, I2, and I4 in the formula (3) is assumed to be an average pixel value of the pixels in an identical polarization direction within the peripheral pixel region. That is, in the case of FIG. 7A, the defect detecting section 35 uses the pixel values I1, I2, and I4 calculated by formulas (7) to (9).

$$I1=(I1(x-1,y-1)+I1(x-1,y+1)+I1(x+1,y+1)+I1(x+1,y-1))/4 \quad (7)$$

$$I2=(I2(x-1,y)+I2(x+1,y))/2 \quad (8)$$

$$I4=(I4(x,y-1)+I4(x,y+1))/2 \quad (9)$$

In a case where the difference between the pixel value of the target polarized pixel and the pixel value estimated is out of the predetermined allowable range, the defect detecting section 35 determines that the target polarized pixel is the defective pixel. That is, in a case where the pixel value I3(x, y) of the target polarized pixel C3(x, y) exceeds the allowable range Lp based on the estimated pixel value I3est calculated on the basis of the formula (3) and the formulas (7) to (9), the defect detecting section 35 determines that the target polarized pixel is the defective pixel. It is noted that FIG. 7B depicts the polarization model with the pixel values with respect to the polarization directions. White circles indicate the pixel values of the target polarized pixel and the peripheral pixels. Black circles indicate the average pixel values for respective polarization directions. A triangle indicates the estimated pixel value.

In a case where the pixel value I3(x, y) of the target polarized pixel C3(x, y) is within the allowable range Lp, the defect detecting section 35 determines that the target polarized pixel C3(x, y) is the non-defective pixel. The allowable range Lp may be predetermined or may be adjusted according to a non-polarized pixel value (e.g., I2+I4). Specifically, as the non-polarized pixel value becomes smaller, the allowable range Lp is narrowed. With this configuration, it is possible to prevent the defective pixel from being determined as the non-defective pixel in a case where the non-polarized pixel value becomes smaller, for example, while in a case where the allowable range is fixed and the non-polarized pixel value becomes smaller, the defective pixel is more likely to be determined as the non-defective pixel.

As the corrected pixel value of the defective pixel, the defect correcting section 36 specifies the estimated pixel value estimated on the basis of the polarization characteristics corresponding to the pixel values generated in the peripheral pixels in the polarization directions different from the polarization direction of the defective pixel, for example. In a case where the target polarized pixel C3(x, y) has been determined to be the defective pixel, the defect correcting section 36 specifies the estimated pixel value I3est, which has been calculated, as the corrected pixel value I3c(x, y) of the target polarized pixel C3(x, y).

It is noted that in a case where the target polarized pixel is the pixel C1, C2, or C4, the corresponding estimated pixel value I1est, I2est, or I4est calculated using the corresponding one of the formulas (4) to (6) is used to determine and correct the defective pixel.

Further, the defect detecting section 35 is not limited to calculating the estimated pixel value using the pixel values of the peripheral pixels in the 3×3 pixel region (peripheral pixel region) around the target polarized pixel C3(x, y). For example, in a case where processing is performed in raster scan order, the estimated pixel value cannot be calculated until pixel values of three pixels from the beginning of the third line is obtained. Therefore, the defect detecting section 35 may perform fitting to the polarization model formula using pixel values of other three pixels in the different polarization directions within a 2×2 pixel region including the target polarized pixel and calculate the estimated pixel value of the target polarized pixel. By performing the defect detection using the pixel values in the 2×2 pixel region in this manner, the estimated pixel value can be calculated when the pixel values of two pixels from the beginning of the second line are obtained. This enables prompt start of the pixel defect detection and defect correction.

In the polarized image, in a case where the polarization direction is different between the target polarized pixel and the peripheral pixels, the absolute difference value increases according to the difference in the polarization direction. For example, in a case where the polarization direction of the target polarized pixel is perpendicular to the polarization directions of the peripheral pixels and incident light has an identical polarization component to the polarization direction of the target polarized pixel, the pixel value of the target polarized pixel is greater than the pixel values of the peripheral pixels. Therefore, in a case where the defect detection is performed on the basis of the absolute difference value with the peripheral pixels in a similar manner to a conventional non-polarized image for which no polarizer is used, the target polarized pixel is determined to be the defective pixel even if the target polarized pixel is not defective.

However, according to the first embodiment, the defect of the target polarized pixel is detected using the pixel value of the target polarized pixel and the pixel value of the target polarized pixel estimated from the polarization characteristics corresponding to the pixel values of the peripheral pixels in the polarization directions different from the polarization direction of the target polarized pixel. Therefore, even with the peripheral pixels in the different polarization directions, the defect detection can be performed without causing error detection due to the difference in the polarization direction. Further, since the defect detection can be performed using the pixel values of the peripheral pixels in the different polarization directions, the peripheral pixel region can be made smaller than a case where the defect detection is performed on the basis of the absolute difference value with the peripheral pixels in an identical polarization direction in a similar manner to the conventional non-polarized image.

2-2. Second Embodiment

Next, the second embodiment will be described. The second embodiment is different from the first embodiment in the operation of the defect detecting section. In the second embodiment, peripheral pixels include a plurality of pixels in identical polarization directions different from the polarization direction of the target polarized pixel. Further, the defect detecting section switches a pixel to be selected from the plurality of pixels in the identical polarization direction, thereby creating a plurality of combinations of the peripheral pixels used for estimation of the pixel value of the target polarized pixel. In addition, the defect detecting section detects the defect of the target polarized pixel according to a ratio of combinations with which the pixel value of the target polarized pixel exceeds the allowable range based on the estimated pixel value.

FIGS. 8A, 8B, 8C, and 8D depict diagrams of assistance in explaining the defect determining operation of the defect detecting section according to the second embodiment. The defect detecting section 35 calculates the estimated pixel value using the pixel values of the peripheral pixels in the 3×3 pixel region (peripheral pixel region) around the target polarized pixel C3(x, y). In a case where the polarization direction of the target polarized pixel C3 is 90°, the polarization directions of the peripheral pixels C1(x−1, y−1), C1(x−1, y+1), C1(x+1, y+1), and C1(x+1, y−1) are 0°, the polarization directions of the peripheral pixels C2(x−1, y) and C2(x+1, y) are 45°, and the polarization directions of the peripheral pixels C4(x, y−1) and C4(x, y+1) are 135°, the formula (3) holds in the ideal state as described above. In the second embodiment, each of the pixel values I1, I2, and I4 in the formula (3) is selected and used from the plurality of pixel values in the corresponding identical polarization direction within the peripheral pixel region. Here, the peripheral pixel region includes four pixels C1, two pixels C2, and two pixels C4. Therefore, the number of combinations of the peripheral pixels is sixteen (4×2×2). The defect detecting section 35 calculates the estimated pixel value for each of the sixteen combinations.

Figure 8A:
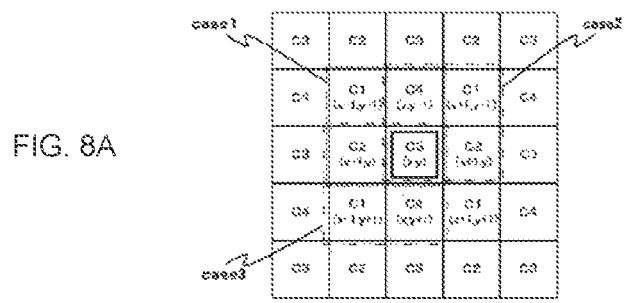
FIGS. 8A, 8B, 8C, and 8D depict diagrams of assistance in explaining a defect determining operation of the defect detecting section according to a second embodiment.
Figure 8B:
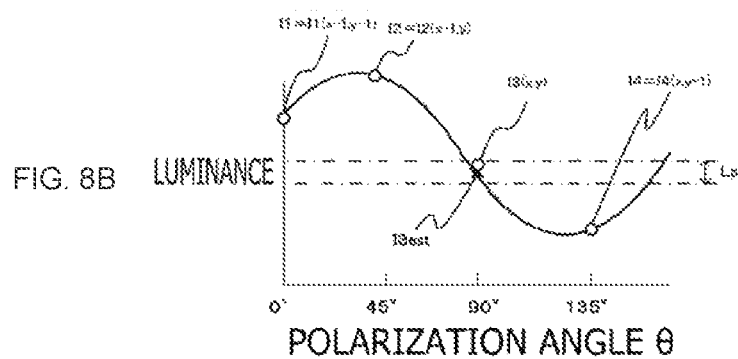
Figure 8C:
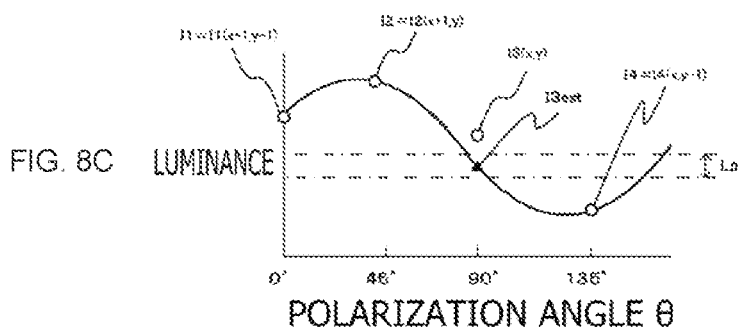
Figure 8D:
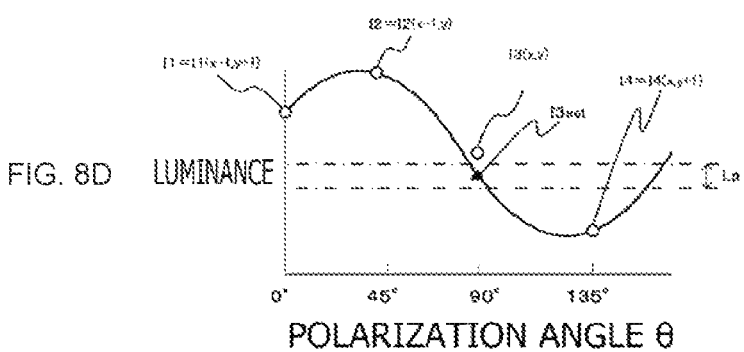

For each combination, the defect detecting section 35 calculates the estimated pixel value I3est on the basis of the formula (3) and determines whether the pixel value I3(x, y) of the target polarized pixel C3(x, y) exceeds the allowable range Lp based on the estimated pixel value I3est. FIG. 8A depicts the peripheral pixels in the 3×3 pixel region (peripheral pixel region) around the target polarized pixel C3(x, y). FIGS. 8B, 8C, and 8D illustrate the polarization model formulas of part of different combinations of the peripheral pixels. As depicted in FIG. 8B, in a combination (case1) indicated by a dotted line in FIG. 8A, the pixel value I3(x, y) of the target polarized pixel C3(x, y) is determined to be within the allowable range Lp. Further, as depicted in FIG. 8C, in a combination (case2) indicated by a one-dot chain line in FIG. 8A, the pixel value I3(x, y) of the target polarized pixel C3(x, y) is determined to be out of the allowable range Lp. Further, as depicted in FIG. 8D, in a combination (case3) indicated by a two-dot chain line in FIG. 8A, the pixel value I3(x, y) of the target polarized pixel C3(x, y) is determined to be out of the allowable range Lp. In addition, whether the pixel value I3(x, y) of the target polarized pixel C3(x, y) is out of the allowable range Lp is similarly determined for other combinations, not illustrated. It is noted that similarly to the first embodiment, the allowable range Lp may be predetermined or may be adjusted according to the non-polarized pixel value (e.g., I2+I4).

After that, in a case where a ratio of the combinations with which the pixel value I3(x, y) of the target polarized pixel C3(x, y) has been determined to be out of the allowable range Lp is greater than a predetermined ratio, the defect detecting section 35 determines that the target polarized pixel C3(x, y) is the defective pixel. In a case where the ratio of the combinations is equal to or less than the predetermined ratio, the defect detecting section 35 determines that the target polarized pixel C3(x, y) is the non-defective pixel.

In a case where the target polarized pixel C3(x, y) has been determined to be the defective pixel, the defect correcting section 36 calculates the corrected pixel value I3c(x, y) of the target polarized pixel C3(x, y) on the basis of the estimated pixel value I3est calculated with each combination. As the corrected pixel value I3c(x, y), the defect correcting section 36 specifies, for example, an average value of the estimated pixel values I3est calculated with respective combinations. Further, as the corrected pixel value I3c(x, y) of the target polarized pixel C3(x, y), the defect correcting section 36 may specify the estimated pixel value I3est calculated in a similar manner to the first embodiment.

It is noted that even in a case where the target polarized pixel to be corrected is the pixel C1, C2, or C4, it is also possible to perform the defective pixel detection and correction by performing similar processing using the corresponding one of the formulas (4) to (6).

According to the second embodiment, as described above, the defect detection can be performed with high accuracy similarly to the first embodiment. Further, since the defect detection can be performed with the plurality of combinations of the peripheral pixels, the defect detection can be stabilized as compared to the first embodiment.

2-3. Third Embodiment

Next, the third embodiment will be described. The third embodiment is different from the first to second embodiments in the operation of the defect detecting section. In the third embodiment, the defect detection is performed using not only the peripheral pixels that are positioned in the periphery of the target polarized pixel and that are in the different polarization directions from the target polarized pixel, but also pixel values of pixels that are close to the target polarized pixel and that are in an identical polarization direction to the target polarized pixel.

FIG. 9 is a diagram of assistance in explaining the defect determining operation of the defect detecting section according to the third embodiment. The defect detecting section 35 performs the defect detection (defect detection using peripheral information) using the pixel values of pixels C3(x, y−2), C3(x−2, y), C3(x+2, y), and C3(x, y+2). The pixels C3(x, y−2), C3(x−2, y), C3(x+2, y), and C3(x, y+2) are peripheral pixels in an identical polarization direction to the target polarized pixel C3(x, y). Further, as in the first or second embodiment, the defect detecting section 35 performs the defect detection (defect detection using the polarization characteristics) using the pixel values of the peripheral pixels in the different polarization directions within the peripheral pixel region around the target polarized pixel C3(x, y). In addition, the defect detecting section 35 determines whether the target polarized pixel C3(x, y) is the defective pixel on the basis of the results of the defect detection using the peripheral information and the defect detection using the polarization characteristics.

In the defect detection using the peripheral information, in a case where the difference between the average value of the peripheral pixels in the identical polarization direction and the pixel value of the target polarized pixel is out of a second allowable range, for example, in a case where a condition of a formula (10) is satisfied, it is determined that the target polarized pixel is a defective pixel candidate. The pixel values of the pixels C3(x, y−2), C3(x−2, y), C3(x+2, y), and C3(x, y+2) are I3(x, y−2), I3(x−2, y), I3(x+2, y), and I3(x, y+2), respectively.

$$((I3(x,y-2)+I3(x-2,y)+I3(x+2,y)+I3(x,y+2))/4)- I3(x,y)>DEth \quad (10)$$

Figure 10:
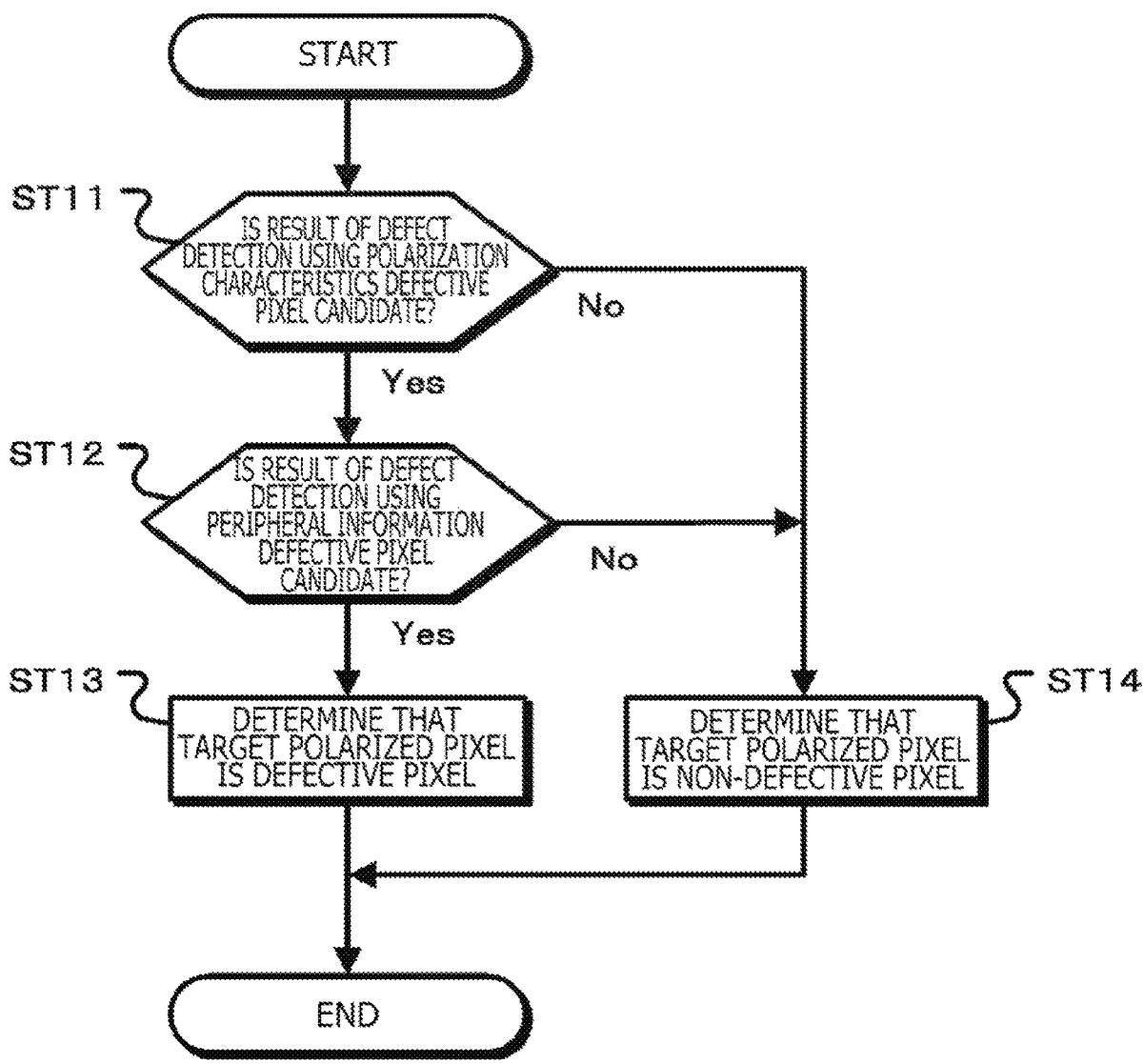
FIG. 10 is a flowchart illustrating the defect determining operation of the defect detecting section according to the third embodiment.

FIG. 10 is a flowchart illustrating the defect determining operation of the defect detecting section according to the third embodiment. In step ST11, the defect detecting section determines whether the result of the defect detection using the polarization characteristics is the defective pixel candidate. The defect detecting section 35 performs the defect detection using the polarization characteristics, which is the defect detection similar to the first or the second embodiment. In a case where the pixel value of the target polarized pixel is out of the allowable range Lp, the defect detecting section 35 determines that the target polarized pixel is the defective pixel candidate and proceeds to step ST12. Further, in a case where the pixel value of the target polarized pixel is within the allowable range Lp, the defect detecting section 35 determines that the target polarized pixel is not the defective pixel candidate and proceeds to step ST14.

In step ST12, the defect detecting section determines whether the result of the defect detection using the peripheral information is the defective pixel candidate. The defect detecting section 35 performs the defect detection using the peripheral information. In a case where the difference between the average value of the peripheral pixels in the identical polarization direction and the pixel value of the target polarized pixel is greater than a threshold value, the defect detecting section 35 determines that the target polarized pixel is the defective pixel candidate and proceeds to step ST13. Further, in a case where the difference is equal to or less than the threshold value, the defect detecting section 35 determines that the target polarized pixel is not the defective pixel candidate and proceeds to step ST14.

In step ST13, the defect detecting section determines that the target polarized pixel is the defective pixel. Since the target polarized pixel has been determined to be the defective pixel candidate on the basis of the defect detection using the polarization characteristics and the defect detection using the peripheral information, the defect detecting section 35 determines that the target polarized pixel is the defective pixel.

In step ST14, the defect detecting section determines that the target polarized pixel is the non-defective pixel. Since the target polarized pixel has been determined to be not the defective pixel candidate on the basis of the defect detection using the polarization characteristics or the defect detection using the peripheral information, the defect detecting section 35 determines that the target polarized pixel is the non-defective pixel. Performing the defect determining operation in this manner can ensure the detection of the defective pixel.

Figure 11:
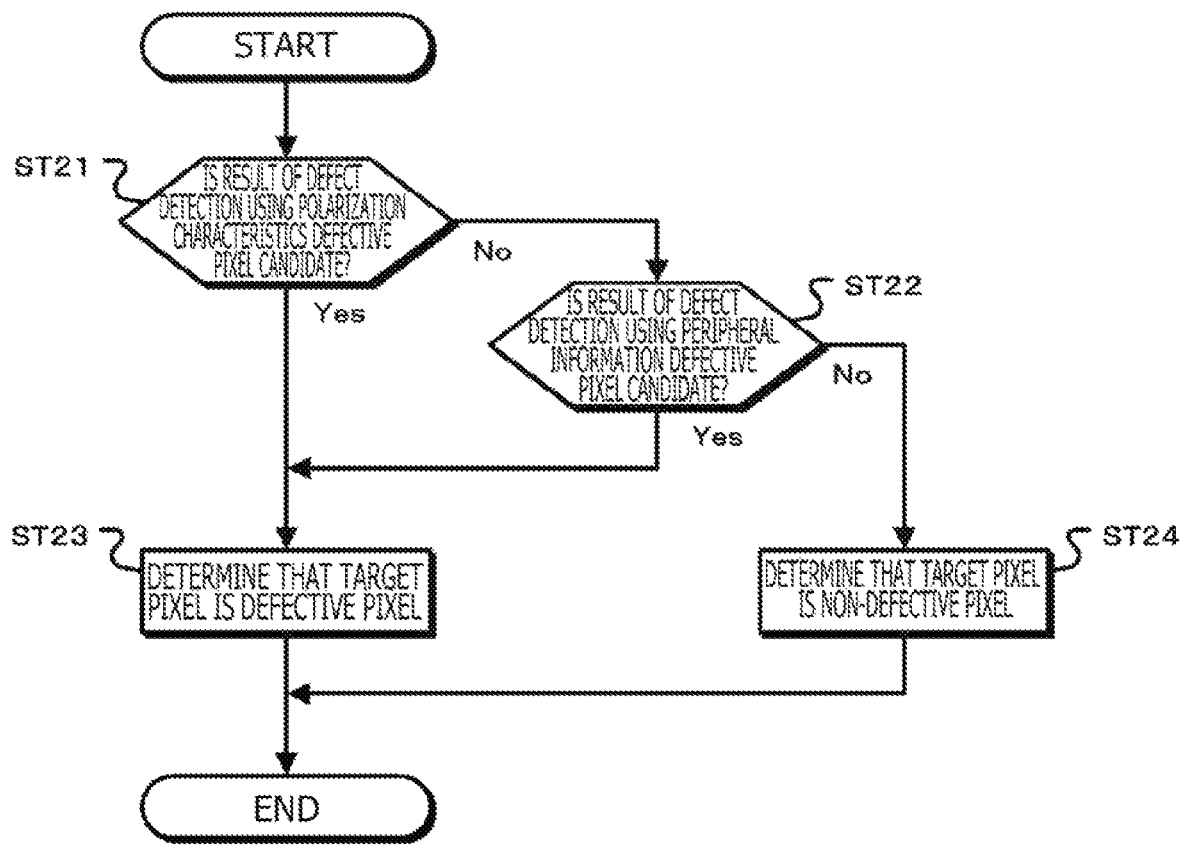
FIG. 11 is a flowchart illustrating another defect determining operation of the defect detecting section according to the third embodiment.

FIG. 11 is a flowchart illustrating another defect determining operation of the defect detecting section according to the third embodiment. In step ST21, the defect detecting section determines whether the result of the defect detection using the polarization characteristics is the defective pixel candidate. The defect detecting section 35 performs the defect detection using the polarization characteristics, which is the defect detection similar to the first or second embodiment. In a case where the pixel value of the target polarized pixel is out of the allowable range Lp, the defect detecting section 35 determines that the target polarized pixel is the defective pixel candidate and proceeds to step ST23. Further, in a case where the pixel value of the target polarized pixel is within the allowable range Lp, the defect detecting section 35 determines that the target polarized pixel is not the defective pixel candidate and proceeds to step ST22.

In step ST22, the defect detecting section determines whether the result of the defect detection using the peripheral information is the defective pixel candidate. The defect detecting section 35 performs the defect detection using the peripheral information. In a case where the difference between an average value of the close pixels in the identical polarization direction and the pixel value of the target polarized pixel is greater than the threshold value, the defect detecting section 35 determines that the target polarized pixel is the defective pixel candidate and proceeds to step ST23. Further, in a case where the difference is equal to or less than the threshold value, the defect detecting section 35 determines that the target polarized pixel is not the defective pixel candidate and proceeds to step ST24.

In step ST23, the defect detecting section determines that the target polarized pixel is the defective pixel. In a case where the target polarized pixel has been determined to be the defective pixel candidate on the basis of either the defect detection using the polarization characteristics or the defect detection using the peripheral information, the defect detecting section 35 determines that the target polarized pixel is the defective pixel.

In step ST24, the defect detecting section determines that the target polarized pixel is the non-defective pixel. Since the target polarized pixel has been determined to be not the defective pixel candidate on the basis of the defect detection using the polarization characteristics and the defect detection using the peripheral information, the defect detecting section 35 determines that the target polarized pixel is the non-defective pixel. Performing the defect determining operation in this manner can reduce the failure to detect the defective pixel.

In a case where the target polarized pixel C3(x, y) has been determined to be the defective pixel, the defect correcting section 36 performs the arithmetic operation similar to the first embodiment to calculate the estimated pixel value I3est and specifies the calculated estimated pixel value I3est as the corrected pixel value I3c(x, y) of the target polarized pixel C3(x, y). Alternatively, in a case where the target polarized pixel C3(x, y) has been determined to be the defective pixel, the defect correcting section 36 may, for example, specify the average value of the estimated pixel values I3est calculated with respective combinations as the corrected pixel value I3c(x, y), similarly to the second embodiment.

According to the third embodiment described above, since the defect detection is performed further using the peripheral pixels in the identical polarization direction, it is possible to improve the defect detection performance as compared to the case where the defect detection is performed only using the peripheral pixels in the different polarization directions.

2-4. Fourth Embodiment

Next, the fourth embodiment will be described. The fourth embodiment is different from the first to third embodiments in the operation of the defect correcting section. In the fourth embodiment, the defect correcting section calculates the corrected pixel value of the target polarized pixel using the pixel values of the peripheral pixels in the identical polarization direction.

In a case where the target polarized pixel C3(x, y) has been determined to be the defective pixel, the defect correcting section 36 calculates the pixel value I3c(x, y) using the pixel values of the peripheral pixels in the identical polarization direction. For example, in a case where the pixel values of the pixels C3(x, y−2), C3(x−2, y), C3(x+2, y), and C3(x, y+2) depicted in FIG. 9 are I3(x, y−2), I3(x−2, y), I3(x+2, y), and I3(x, y+2), respectively, the defect correcting section 36 calculates I3c(x, y) by performing an arithmetic operation of a formula (11).

$$I3c(x,y)=((I3(x,y-2)+I3(x-2,y)+I3(x+2,y)+I3(x,y+2))/4 \quad (11)$$

Further, the corrected pixel value of the target polarized pixel may be calculated using the pixel values of the peripheral pixels that are in the identical polarization direction and that are arranged in the horizontal direction. For example, in a case where the target polarized pixel C3(x, y) has been determined to be the defective pixel, an arithmetic operation of a formula (12) is performed to calculate I3c(x, y).

$$I3c(x,y)=(I3(x-2,y)+I3(x+2,y))/4 \quad (12)$$

In the fourth embodiment, as described above, the corrected pixel value of the target polarized pixel is calculated using the pixel values of the peripheral pixels in the identical polarization direction. This can facilitate correction of the defective pixel. Further, performing the defect correction using the pixel values of the peripheral pixels arranged in the horizontal direction enables the defect correction only using the pixels in one line. This can reduce the circuit scale in a case where the defect correcting section 36 includes hardware.

2-5. Fifth Embodiment

Next, the fifth embodiment will be described. The fifth embodiment is different from the fourth embodiment in the operation of the defect correcting section. In the fifth embodiment, the corrected pixel value of the defective pixel is calculated using the pixel values of the peripheral pixels determined to be in the identical polarization direction to the defective pixel and to have identical texture to the defective pixel.

The texture detection is performed in the horizontal direction and the vertical direction to detect whether the peripheral pixel region includes a texture boundary. On the basis of a result of the texture detection, the peripheral pixels used for calculation of the corrected pixel value are selected. The defect correcting section 36 performs the texture detection using a Laplacian filter, for example. In a case where the target polarized pixel is the pixel C3(x, y) depicted in FIG. 9, the defect correcting section 36 calculates a horizontal direction texture determination value dh on the basis of a formula (13) and a vertical direction texture determination value dv on the basis of a formula (14). In a case where the texture is identical, absolute values of the texture determination values are small. In a case where the texture is different, the absolute values of the texture determination values are large.

$$dh=ABS(I3(x,y-2)-2\times I3(x,y)+I3(x,y+2)) \quad (13)$$

$$dv=ABS(I3(x-2,y)-2\times I3(x,y)+I3(x+2,y)) \quad (14)$$

In addition, the defect correcting section 36 compares the horizontal direction texture determination value dh with the horizontal direction texture determination value dh. As indicated by formulas (15) to (17), the defect correcting section 36 calculates the corrected pixel value of the pixel C3(x, y) using the pixel values of the peripheral pixels determined to be in the identical polarization direction to the defective pixel and to have the identical texture to the defective pixel.

In the case of dh>dv $$I3c(x,y)=(I3(x-2,y)+I3(x+2,y))/2 \quad (15)$$

In the case of dh<dv $$I3c(x,y)=(I3(x,y-2)+I3(x,y+2))/2 \quad (16)$$

In the case of dh=dv $$I3c(x,y)=((I3(x,y-2)+I3(x-2,y)+I3(x+2,y)+I3(x,y+2))/4 \quad (17)$$

It is noted that as long as the texture boundary is detectable, the texture detection is not limited to the use of the Laplacian filter and a high-pass filter or a sobel filter may be used.

In the fifth embodiment, as described above, the texture detection is performed and the defect correction is performed using the pixel values of the peripheral pixels determined to be in the identical polarization direction to the defective pixel and to have the identical texture to the defective pixel. Since the peripheral pixels having different texture are not used for the defect correction, the defective pixel can be corrected with high accuracy.

2-6. Sixth Embodiment

Next, the sixth embodiment will be described. In the first to fifth embodiments described above, the defect detection is performed using the peripheral pixels in the spatial direction, that is, the peripheral pixels in the identical frame to the target polarized pixel. In the sixth embodiment, the defect detection is performed using the peripheral pixels in the time direction as well. Hereinafter, description will be made with regard to a case where the defect detection is performed using a frame and a past frame of the target polarized pixel.

Figure 12:
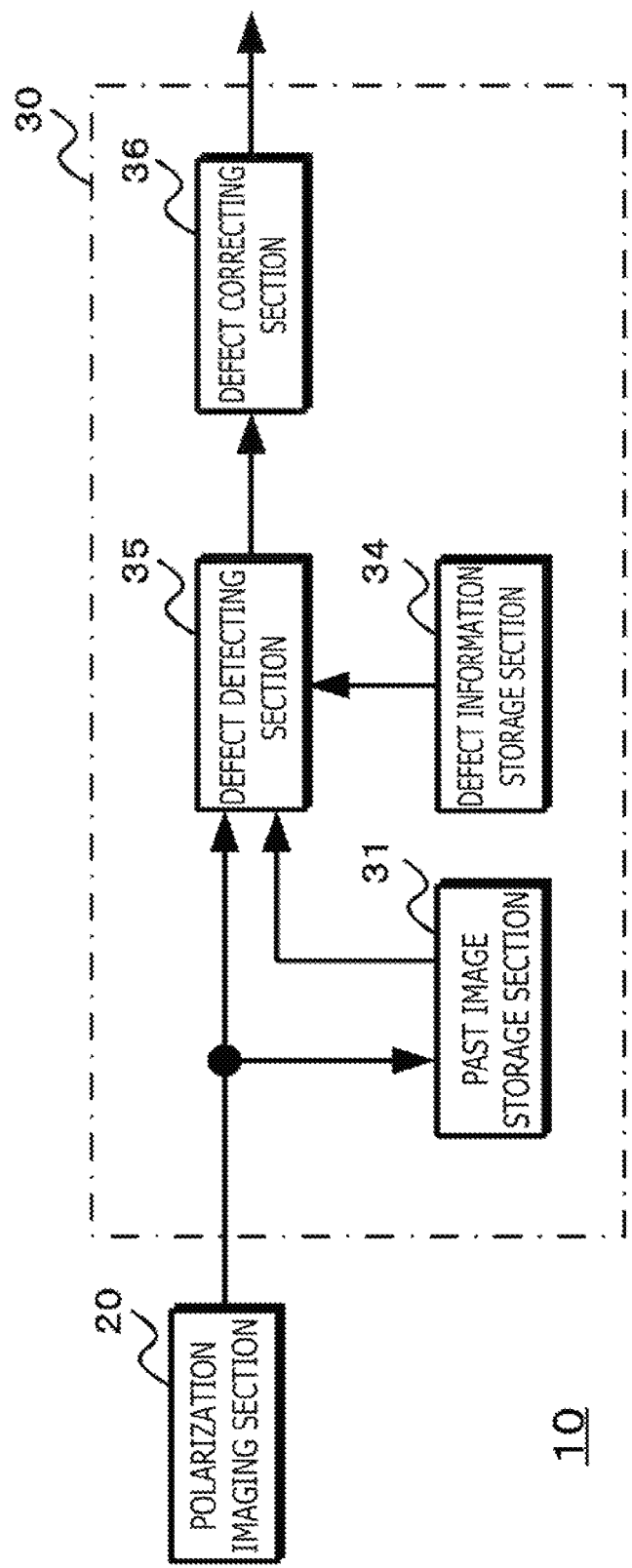
FIG. 12 is a diagram illustrating a configuration of a sixth embodiment.

FIG. 12 illustrates a configuration of the sixth embodiment. The image processing section 30 includes a past image storage section 31, the defect information storage section 34, the defect detecting section 35, and the defect correcting section 36.

The past image storage section 31 stores polarized images for the predetermined number of past frames generated by the polarization imaging section 20. Further, the polarized images stored in the past image storage section 31 are output to the defect detecting section 35.

The defect detecting section 35 detects the defect of the target polarized pixel in the polarized image on the basis of the defect information stored in the defect information storage section 34 and the polarized images stored in the past image storage section 31.

In a case where the polarized image to be subjected to the defect detection is in an nth frame and polarized images in an (n−1)th frame and an (n−2)th frame are used as past polarized images, for example, the defect detecting section 35 generates an averaged polarized image of the polarized images in the nth frame to the (n−2)th frame. The defect detecting section 35 generates the averaged polarized image by averaging the pixel values of the nth frame, the (n−1)th frame, and the (n−2)th frame for each pixel position. In a case where the defect detecting section 35 calculates the estimated pixel value using the formula (3), the defect detecting section 35 uses the pixel values I1, I2, and I4 of the respective peripheral pixels C1, C2, and C4 of the averaged polarized image. Further, images having the identical texture to the polarized image to be subjected to the defect detection are used as the past polarized images.

In a case where the target polarized pixel C3 has been determined to be the defective pixel on the basis of the estimated pixel value, the defect correcting section 36 specifies the estimated pixel value as the corrected pixel value I3c of the target polarized pixel C3. Further, the defect correcting section 36 calculates the estimated pixel value of the known defective pixel, and specifies the estimated pixel value, which has been calculated, as the corrected pixel value of the known defective pixel.

Through the processing as described above, even in a case where noise or the like occurs in the peripheral pixels of the nth frame at the time of capturing a moving image, for example, it is possible to perform the defect detection and the defect correction with reduced influence of noise or the like using the past polarized images.

2-7. Seventh Embodiment

In the seventh embodiment, description will be made with regard to updating of the defect information in the defect information storage section 34 on the basis of a result of the defect detection by the defect detecting section 35.

Figure 13:
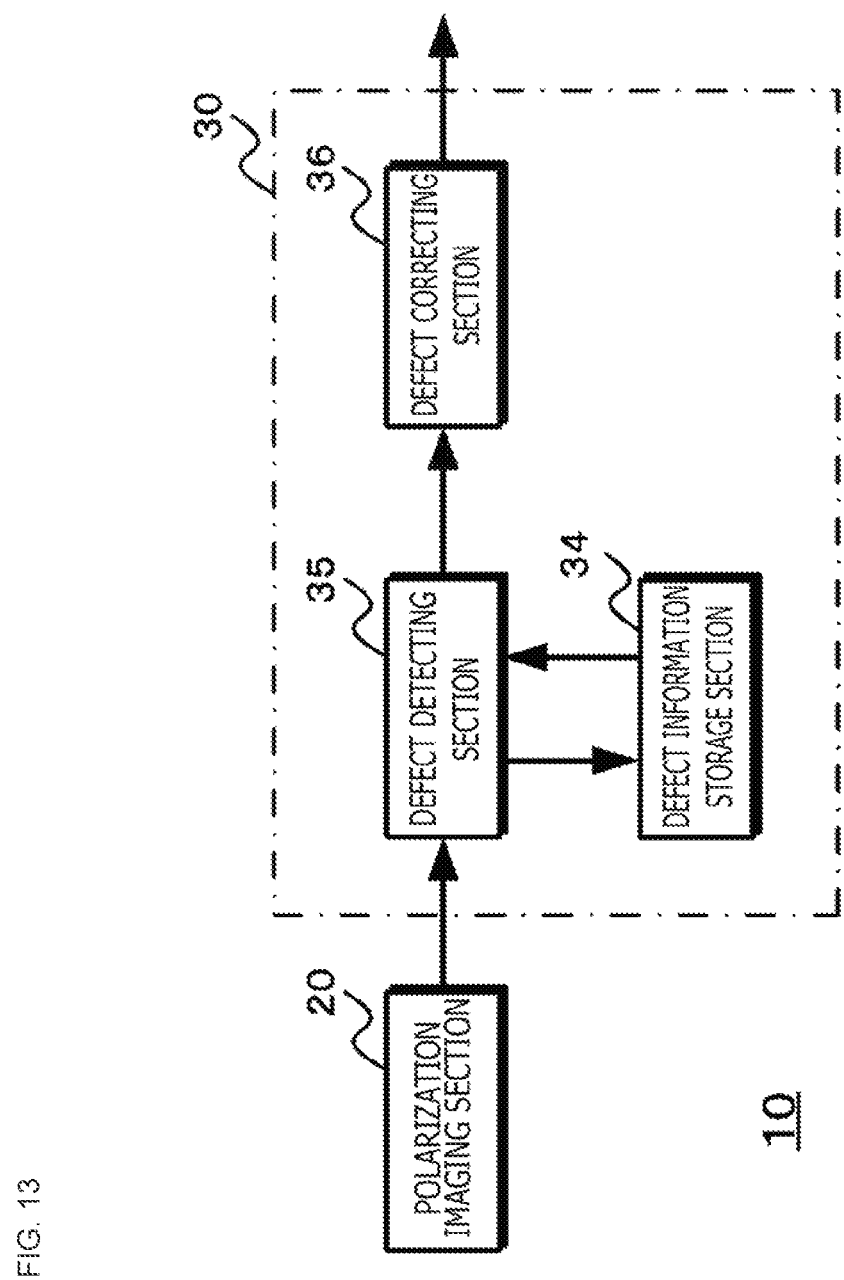
FIG. 13 is a diagram illustrating a configuration of a seventh embodiment.

FIG. 13 illustrates a configuration of the seventh embodiment. The image processing section 30 includes the defect information storage section 34, the defect detecting section 35, and the defect correcting section 36. The defect detecting section 35 generates additional defect information and outputs the additional defect information to the defect information storage section 34. The additional defect information indicates the position of the detected defective pixel. The defect information storage section 34 uses the additional defect information supplied from the defect detecting section 35 to update the defect information, which has been stored. Further, when the defect detecting section 35 performs the defect detection of the polarized image later, the defect information storage section 34 outputs the updated defect information to the defect detecting section 35.

Figure 14:
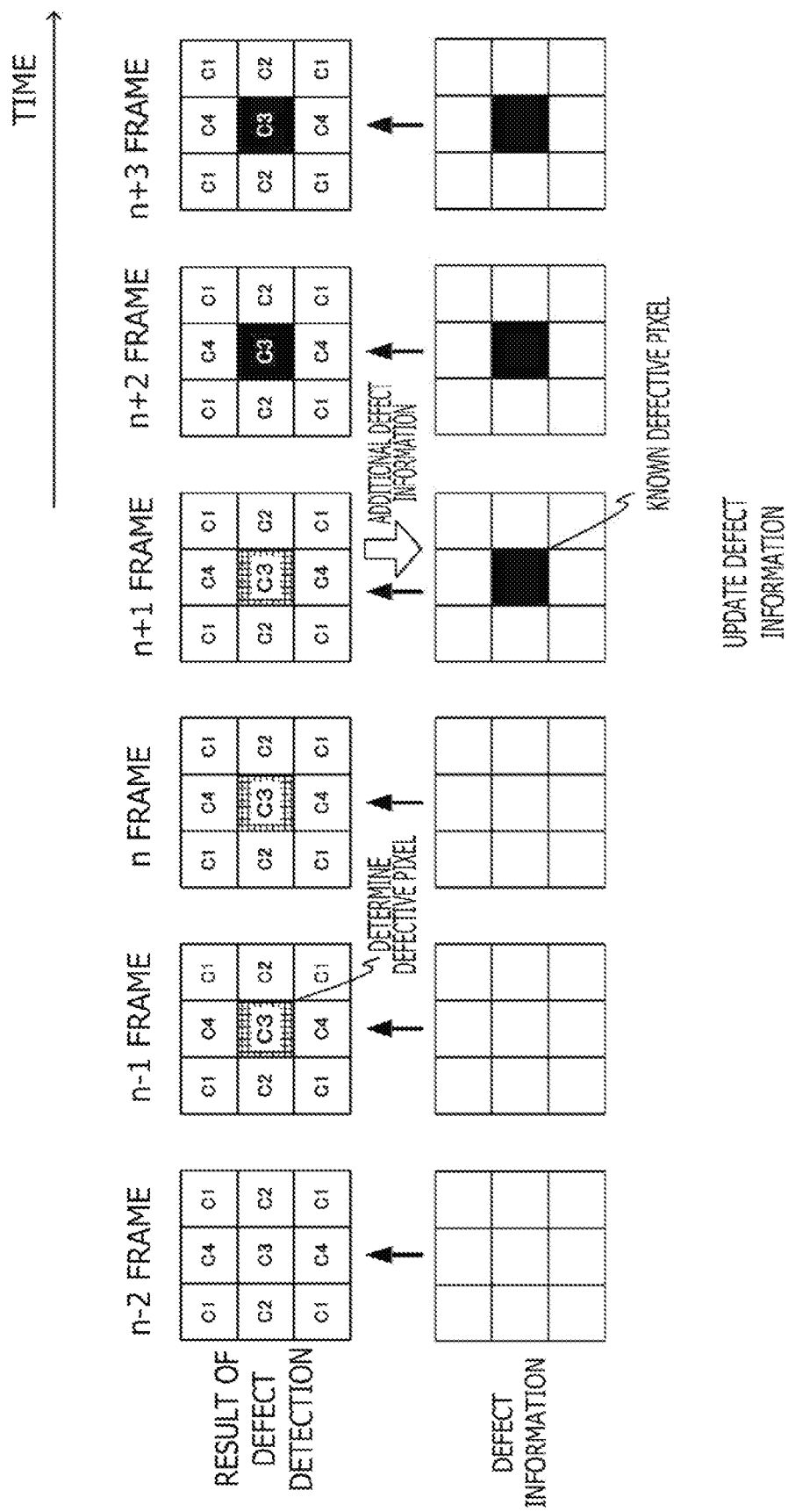
FIG. 14 is a diagram of assistance in explaining an operation of the defect detecting section according to the seventh embodiment.

FIG. 14 is a diagram of assistance in explaining an operation of the defect detecting section according to the seventh embodiment. In a case where a pixel has been newly determined as the defective pixel and the pixel newly determined as the defective pixel has continuously been determined as the defective pixel in the predetermined number of successive frames, for example, the defect detecting section 35 generates additional defect information indicating the pixel position of the defective pixel, and outputs the additional defect information to the defect information storage section 34. For example, in a case where the pixel C3 has not been determined as the defective pixel in the n−2th frame, but has been determined as the defective pixel successively in the n−1th frame to the n+1th frame, the defect detecting section 35 generates additional defect information indicating the pixel position of the pixel C3 that has been determined as the defective pixel in the predetermined number of successive frames (three frames in the figure). The defect detecting section 35 then outputs the additional defect information to the defect information storage section 34.

On the basis of the additional defect information supplied from the defect detecting section 35, the defect information storage section 34 updates the stored defect information to add, to the defect information, that the pixel C3 is the defective pixel. Therefore, the pixel C3 is processed as the known defective pixel during the defect detection of the polarized image in and after the n+2th frame.

According to the seventh embodiment, as described above, in a case where the non-defective pixel becomes the defective pixel, the pixel that has become defective is registered as the known defective pixel in the defect information. Therefore, the defect detection is not continuously performed for the pixel that has become defective, resulting in efficient defect detection. Further, in a case where a pixel is continuously determined as the defective pixel in the predetermined number of successive frames, the defect information is updated. Therefore, for example, even if a pixel is erroneously detected as the defective pixel in one frame, the defect information is not updated by this defect detection result.

2-8. Eighth Embodiment

Figure 15:
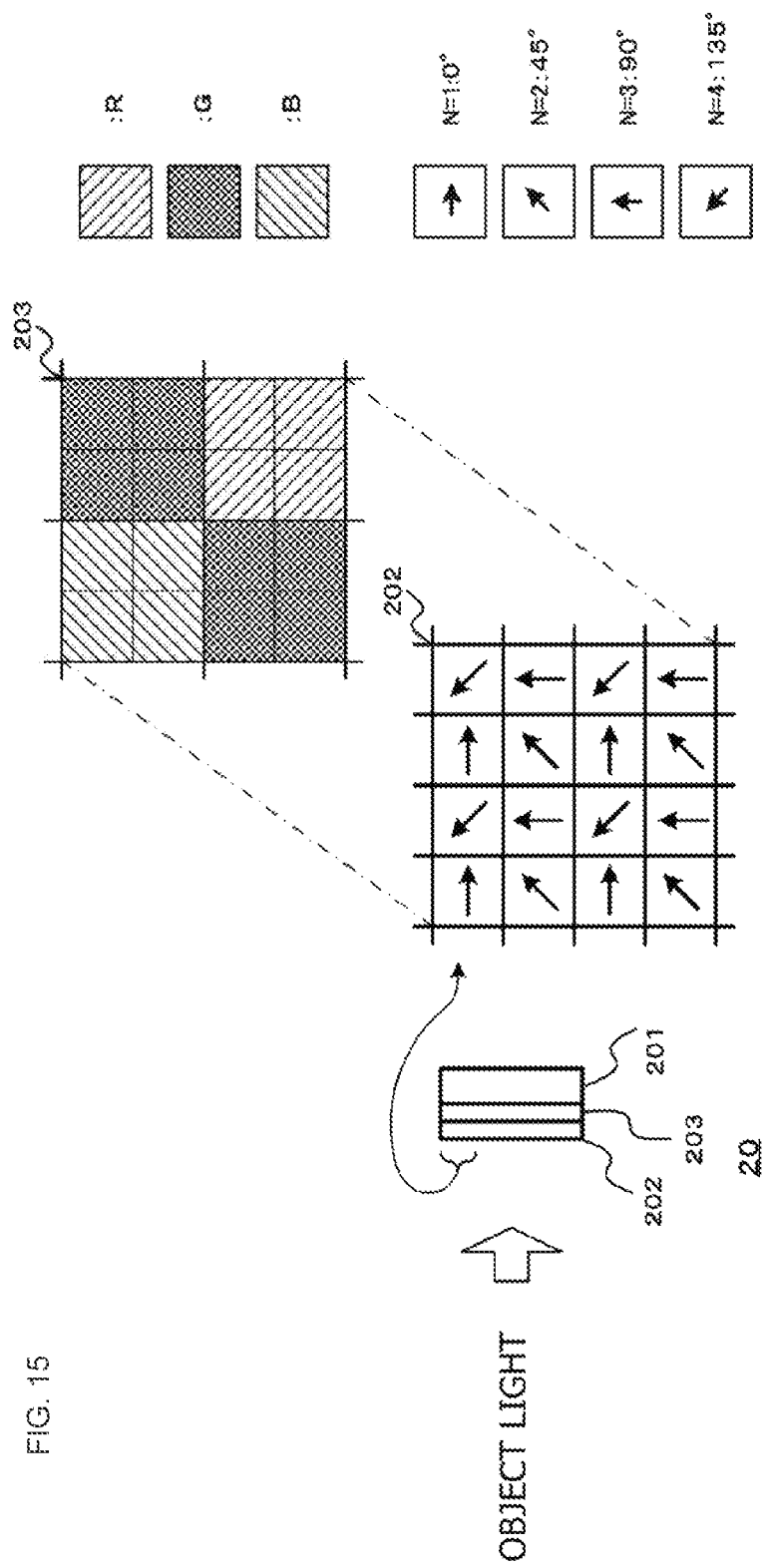
FIG. 15 is a diagram illustrating a configuration of the polarization imaging section that generates a color polarized image.

Next, in the eighth embodiment, description will be made with regard to a case where the polarized image is a color image. The polarization imaging section 20 generates a color polarized image including polarized pixels for each polarization direction among a plurality of polarization directions. FIG. 15 illustrates a configuration of the polarization imaging section that generates the color polarized image. The polarization imaging section 20 includes: the image sensor 201 such as a complementary metal oxide semiconductor (CMOS) and a charge coupled device (CCD); the polarizer 202; and a color filter 203. The image sensor 201 performs photoelectric conversion on object light that has been incident through the polarizer 202 and the color filter 203 and generates image signals according to the object light, that is, image signals of the color polarized image. The polarization imaging section 20 outputs the image signals of the color polarized image to the image processing section 30.

It is sufficient if the polarizer 202 can extract linearly polarized light from the object light. For example, a wire grid, a photonic liquid crystal, or the like is used for the polarizer 202. The polarizer 202 includes pixels in a plurality of polarization directions (e.g., four directions of 0°, 45°, 90°, and 135°) such that fitting to the polarization model formula indicated by the formula (1) can be performed using each pixel as a polarization component unit, for example. Further, the color filter 203 includes pixels in a plurality of polarization directions (e.g., four directions of 0°, 45°, 90°, and 135°) as described above. In the color filter 203, a color component array unit is a 2×2 pixel unit, and each 2×2 pixel unit is used as a polarization unit, for example. The color filter 203 uses a color demosaic filter in which red, blue, and green color components (RGB components) are arranged in a Bayer array, for example.

Figure 16:
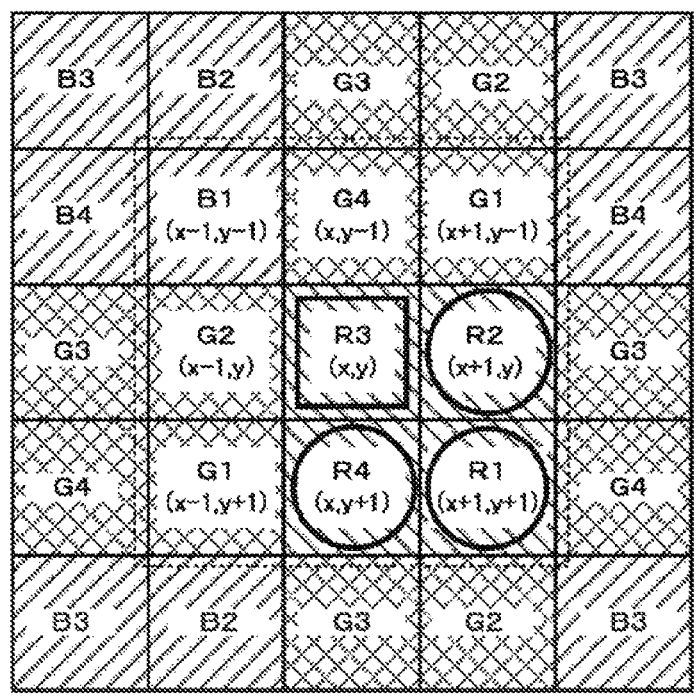
FIG. 16 is a diagram of assistance in explaining a defect determining operation of the defect detecting section according to an eighth embodiment.

FIG. 16 is a diagram of assistance in explaining the defect determining operation of the defect detecting section according to the eighth embodiment. It is noted that a pixel R1 is a red pixel with the polarization direction of 0°, a pixel R2 is a red pixel with the polarization direction of 45°, a pixel R3 is a red pixel with the polarization direction of 90°, and a pixel R4 is a red pixel with the polarization direction of 135°. Similarly, pixels G1 to G4 are green pixels in the respective polarization directions, and pixels B1 to B4 are blue pixels in the respective polarization directions.

The defect detecting section 35 detects the defective pixel by performing processing similar to the flowchart illustrated in FIG. 6. Further, the defect detecting section 35 uses peripheral pixels that are pixels having an identical color component to the target polarized pixel and that are in different polarization directions from the polarization direction of the target polarized pixel.

In a case where it is indicated on the basis of the defect information stored in the defect information storage section 34 that the target polarized pixel in a color polarized RAW image (hereinafter referred to as "color polarized image") generated by the polarization imaging section 20 is not the defective pixel, the defect detecting section 35 performs the defect detection of the target polarized pixel. The defect detecting section 35 determines whether the target polarized pixel is the defective pixel using the peripheral pixels that are pixels having the identical color component to the target polarized pixel and that are in the different polarization directions from the polarization direction of the target polarized pixel. In determining whether the target polarized pixel is the defective pixel, the defect detecting section 35 calculates the estimated pixel value of the target polarized pixel from the polarization model formula after fitting that corresponds to the pixel values of the peripheral pixels. In a case where the pixel value of the target polarized pixel in the polarized image is out of an allowable range based on the estimated pixel value, the defect detecting section 35 determines that the target polarized pixel is the defective pixel. In a case where the defect detecting section 35 has determined that the target polarized pixel is the defective pixel, the defect detecting section 35 adds, to the defect information obtained from the defect information storage section 34, information indicating that the target polarized pixel is the defective pixel. The defect detecting section 35 then outputs the defect information to the defect correcting section 36, together with the polarized image.

The defect detecting section 35 calculates the estimated pixel value using the pixel values of the peripheral pixels having the identical color to the target polarized pixel in the 3×3 pixel region (peripheral pixel region) around the target polarized pixel C3(x, y). In a case where the polarization direction of the target polarized pixel R3 is 90°, the polarization direction of the peripheral pixel R1(x+1, y+1) is 0°, the polarization direction of the peripheral pixel R2(x+1, y) is 45°, and the polarization direction of the peripheral pixel R4(x, y+1) is 135°, a formula (18) holds in the ideal state. It is noted that a pixel value of the peripheral pixel R1(x+1, y+1) is Ir1, a pixel value of the peripheral pixel R2(x+1, y) is Ir2, and a pixel value of the peripheral pixel R4(x, y+1) is Ir4.

$$Ir3 = (Ir2 + Ir4) - Ir1 \tag{18}$$

The defect detecting section 35 specifies the pixel value Ir3 calculated on the basis of the formula (18) as the estimated pixel value Ir3est of the target polarized pixel R3(x, y). In a case where the pixel value Ir3(x, y) of the target polarized pixel R3(x, y) is out of the allowable range Lp based on the estimated pixel value Ir3est, the defect detecting section 35 determines that the target polarized pixel R3(x, y) is the defective pixel. Further, in a case where the pixel value Ir3(x, y) of the target polarized pixel R3(x, y) is within the allowable range Lp, the defect detecting section 35 determines that the target polarized pixel R3(x, y) is the non-defective pixel.

In a case where the target polarized pixel R3(x, y) has been determined to be the defective pixel, the defect correcting section 36 specifies the estimated pixel value Ir3est, which has been calculated, as the corrected pixel value Ir3c(x, y) of the target polarized pixel R3(x, y). Alternatively, the defect correcting section 36 may calculate the corrected pixel value of the target polarized pixel using the pixel values of the peripheral pixels, similarly to the fourth embodiment described above. In this case, the defect correcting section 36 uses, as the peripheral pixels, the pixels that have the identical color component and that are in the identical polarization direction. For example, as depicted in FIG. 16, in a case where the target polarized pixel is R3, the defect correcting section 36 calculates a corrected image value using the pixel R3 indicated by ○ as the peripheral pixel.

According to the eighth embodiment, as described above, even in a case where the polarized image is the color image, the defect detection and the defect correction can be performed using the polarization characteristics.

2-9. Ninth Embodiment

Next, in the ninth embodiment, description will be made with regard to a case of improving the accuracy of the estimated pixel value by aligning the characteristics of each color component and increasing the number of peripheral pixels that can be used for calculation of the estimated pixel value.

Figure 17:
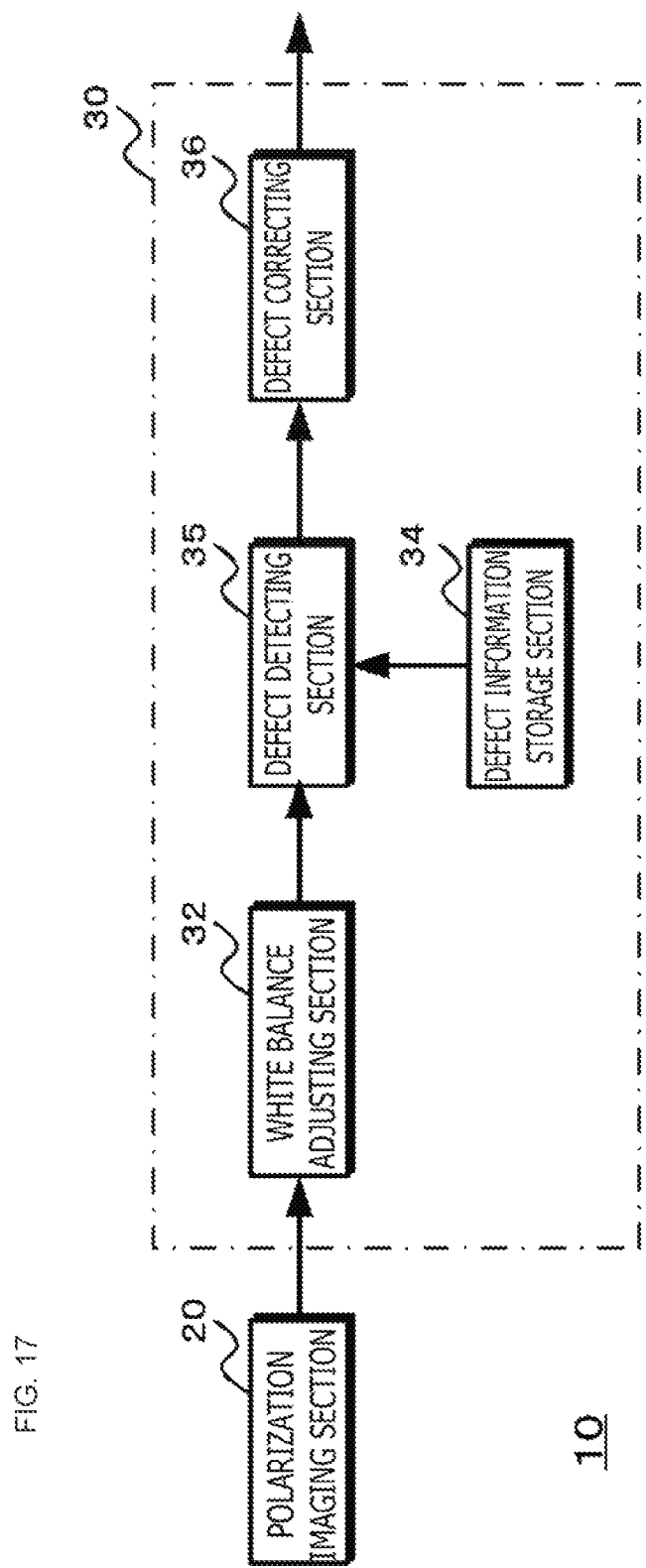
FIG. 17 is a diagram illustrating a configuration of a ninth embodiment.

FIG. 17 illustrates a configuration of the ninth embodiment. The polarization imaging section 20 generates a color polarized image including polarized pixels for each polarization direction among a plurality of polarization directions. The polarization imaging section 20 then outputs the color polarized image to the image processing section 30. The image processing section 30 includes a white balance adjusting section 32, the defect information storage section 34, the defect detecting section 35, and the defect correcting section 36.

When a white object is imaged by the polarization imaging section 20, the white balance adjusting section 32 adjusts the white balance by multiplying a gain corresponding to each color component or each pixel for each polarization direction such that pixel values of the pixels in the identical polarization direction in the polarized image are identical to each other regardless of the color component. Formulas (19) to (21) indicate a case where the white balance is adjusted by multiplying a gain Rgain of a red component, a gain Ggain of a green component, and a gain Bgain of a blue component by a corresponding one of the pixel values of the color components. It is noted that in the formulas (19) to (21), a variable N indicates a polarization direction as described above.

$$Ir[N] = Rgain \times Ir[N] \tag{19}$$

$$Ig[N] = Ggain \times Ig[N] \tag{20}$$

$$Ib[N] = Ggain \times Ib[N] \tag{21}$$

The white balance is adjusted in this manner. Accordingly, when a white object is imaged using the polarization imaging section 20 that generates a color polarized image, a polarized image supplied to the defect detecting section 35 has polarization characteristics similar to the case of using the polarization imaging section 20 that generates a black and white polarized image.

Since the polarized image supplied from the white balance adjusting section 32 has the polarization characteristics similar to the black and white polarized image, the defect detecting section 35 can detect whether the target polarized pixel is the defective pixel by performing the defect detection similar to the first to seventh embodiments using the pixel values of the peripheral pixels having different color components and polarization directions.

According to the ninth embodiment, as described above, the white balance of the color polarized image generated by the polarization imaging section 20 is adjusted. As a result, in a case where it is determined whether the target polarized pixel is the defective pixel, it is possible to use not only the peripheral pixels having the identical color component to the target polarized pixel, but also the peripheral pixels having different color components from the target polarized pixel. Therefore, the defect detection can be performed with high accuracy as compared to the eighth embodiment.

2-10. Tenth Embodiment

Next, the tenth embodiment will be described. In the embodiments described above, description has been made with regard to the case where the polarization imaging section includes the pixels in the four polarization directions, for example, to perform fitting to the polarization model formula using the pixel values of the peripheral pixels. By contrast, in the tenth embodiment, description will be made with regard to a case of including polarized pixels in two polarization directions and non-polarized pixels.

Figure 18A:
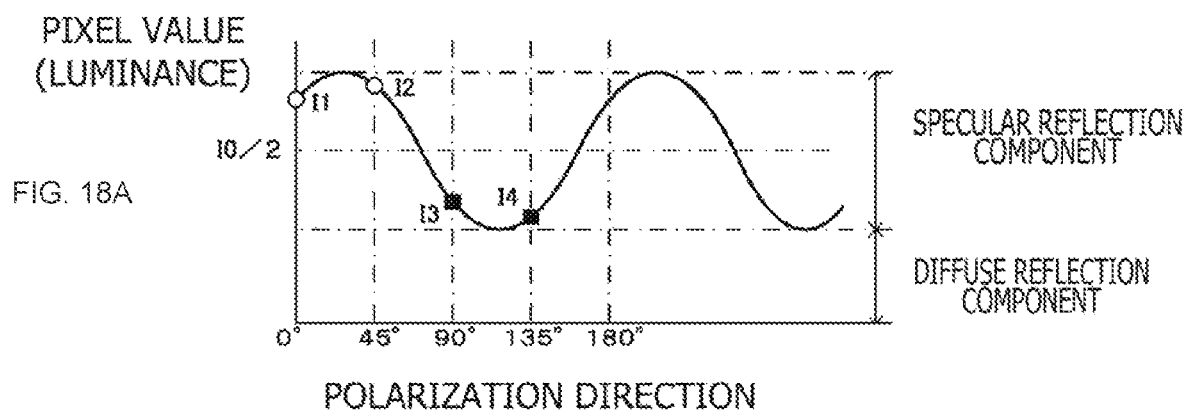
FIGS. 18A and 18B depicts diagrams of assistance in explaining a relationship between pixel values of polarized pixels and pixel values of non-polarized pixels.
Figure 18B:
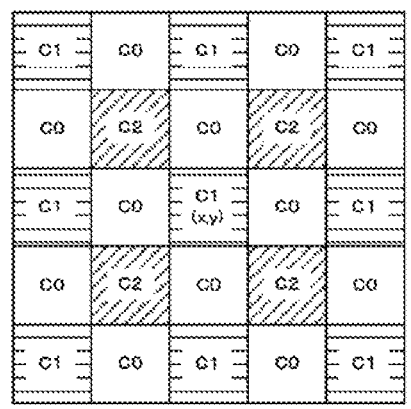

FIGS. 18A, 18B, 18C, and 18D depict a diagram of assistance in explaining a relationship between the pixel values of the polarized pixels and the pixel values of the non-polarized pixels. Ideally, the sensitivity of the polarized pixels is (½) times the sensitivity of the non-polarized pixels. The average value of specular reflection components and the additional value of diffuse reflection components are ½ times a pixel value I0 of each non-polarized pixel. Further, in a case where there are four polarization directions with intervals of 45° and the polarization direction N=1 is 0°, N=2 is 45°, N=3 is 90°, and N4 is 135°, a formula (22) holds, as depicted in FIG. 18A, for example. Here, as depicted in FIG. 18B, in a case where the pixels of the polarization imaging section 20 include non-polarized pixels C0 and polarized pixels C1 and C2, pixel values I3 and I4 of pixels C3 and C4 in the polarization directions with no pixels provided can be calculated on the basis of formulas (23) and (24).

$$(I2+I4)/2=(I1+I3)/2=I0/2 \tag{22}$$

$$I3=I0-I1 \tag{23}$$

$$I4=I0-I2 \tag{24}$$

Here, in a case where the angle difference between the polarization direction of the target polarized pixel and the polarization direction of each of the peripheral pixels is 90°, the sum of the pixel value of the target polarized pixel and the pixel value of the peripheral pixel is "I0/2." Since the pixel values in the polarization directions different from the polarization directions of the target polarized pixel and the peripheral pixels become equal to the pixel values of the target polarized pixel and the peripheral pixels, it is not possible to calculate the polarization characteristics. Therefore, the angle difference between the polarization direction of the target polarized pixel and the polarization direction of each of the peripheral pixels is within a predetermined range based on 45°, for example.

In a peripheral pixel region including 5×5 pixels depicted in FIG. 18B, the defect detecting section 35 calculates the pixel value I1 on the basis of the pixel values of the eight peripheral pixels C1 that are in the identical polarization direction to the target polarized pixel C1. Further, the defect detecting section 35 calculates the pixel values I2 on the basis of the pixel values of the four peripheral pixels C2 that are in the different polarization directions from the polarization direction of the target polarized pixel C1. For example, the defect detecting section 35 specifies the average of the pixel values of the eight peripheral pixels C1 as the pixel value I1 and the average value of the pixel values of the four peripheral pixels C2 as the pixel value I2. In addition, the defect detecting section 35 calculates the pixel values I3 and I4 using the pixel values I1 and I2 calculated from the pixel values of the peripheral pixels to calculate the estimated pixel value of the target polarized pixel C1 on the basis of a formula (25).

$$I1est=(I2+I4)-I3 \tag{25}$$

In a case where the pixel value I1(x, y) of the target polarized pixel C1(x, y) is out of the allowable range Lp based on the estimated pixel value I1est, the defect detecting section 35 determines that the target polarized pixel C1(x, y) is the defective pixel. Further, in a case where the pixel value I1(x, y) of the target polarized pixel C1(x, y) is within the allowable range Lp, the defect detecting section 35 determines that the target polarized pixel C1(x, y) is the non-defective pixel. It is noted that the allowable range Lp is set similarly to the embodiments described above.

In a case where the target polarized pixel C1(x, y) has been determined to be the defective pixel, the defect correcting section 36 specifies the estimated pixel value I1est, which has been calculated, as the corrected pixel value I1c(x, y) of the target polarized pixel C1(x, y). It is noted that in a case where the target polarized pixel is one of the pixels C2, the pixel value calculated using a formula (26) is specified as the estimated pixel value I2est to determine and correct the defective pixel.

$$I2est=(I1+I3)-I4 \tag{26}$$

In the tenth embodiment, the sensitivity of the polarized pixels is (½) times the sensitivity of the non-polarized pixels to facilitate understanding of the technology. In practice, a sensitivity ratio between the polarized pixels and the non-polarized pixels is preliminarily measured, and the measured sensitivity ratio is used to calculate the estimated pixel value. In this manner, the defect detection and the defect correction can be performed with high accuracy according to the sensitivity of the polarization imaging section.

According to the tenth embodiment, as described above, the non-polarized pixels are provided, thereby allowing the defect detection and the defect correction of the polarized pixel even with the polarized pixels in the two polarization directions.

2-11. Other Embodiments

Incidentally, in a case of generating a polarized image in the four polarization directions, the polarizer and the color filter of the polarization imaging section 20 that generates the polarized image are not limited to the configurations described above. FIGS. 19A, 19B, 19C, 19D, 19E, and 19F illustrate other configurations and combinations of the polarizer and the color filter. While the embodiments described above illustrate the case where the polarizer depicted in FIG. 19A and the color filter depicted in FIG. 19C are used, the polarizer may have a configuration depicted in FIG. 19B. The polarizer depicted in FIG. 19B has a configuration in which 2×2 pixels are used as a polarization unit including pixels in an identical polarization direction and polarization units with the four polarization directions are repeatedly provided. The color filter may use a color mosaic filter in which pixels of three primary colors (red pixels R, green pixels G, and blue pixels B) are arranged in a Bayer array, as depicted in FIG. 19D. In the case of using the polarizer with the polarization unit of 2×2 pixels, combining the color demosaic filter in the Bayer array as depicted in FIG. 19E, for example, can generate a polarized image having each color component of the three primary colors with the polarization unit of 2×2 pixels. Further, as depicted in FIG. 19F, the polarizer with the polarization unit of 2×2 pixels and the color filter with the color component unit of 2×2 pixels are used such that the polarization unit and the color component unit are deviated in position by one pixel in the horizontal direction and the vertical direction. Even with this configuration, it is possible to generate a polarized image having each color component of the three primary colors with the polarization unit of 2×2 pixels.

Figure 20B:
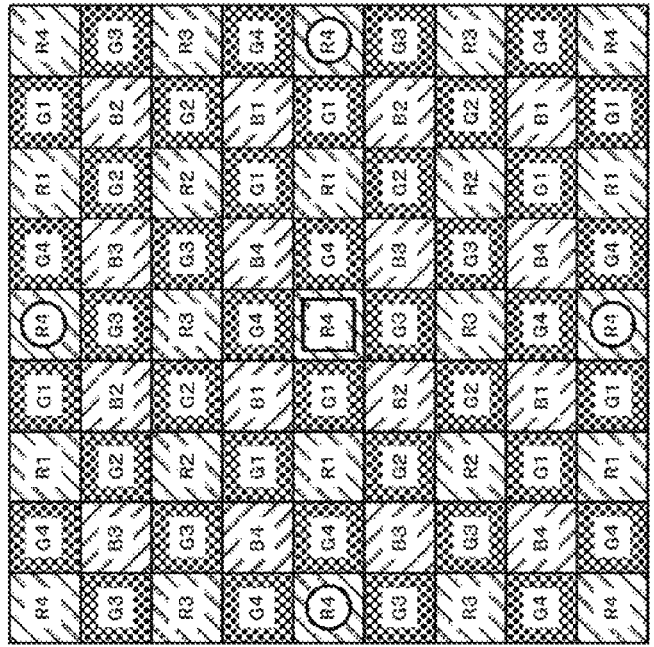
FIGS. 20A and 20B depict diagrams of assistance in explaining a case where a polarizer with a polarization unit of 2×2 pixels is used.
Figure 20A:
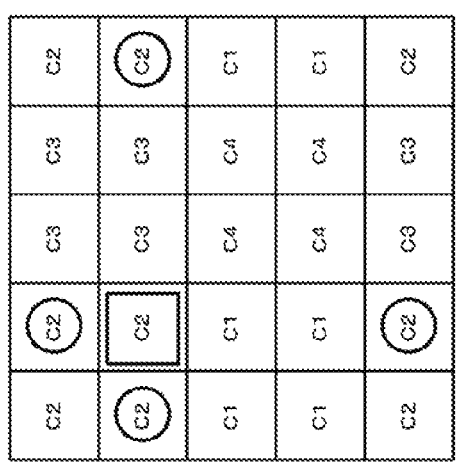

FIGS. 20A and 20B are diagrams of assistance in explaining a case where the polarizer with the polarization unit of 2×2 pixels is used. In a case where a black and white polarized image has been generated using the polarizer with the polarization unit of 2×2 pixels, the defect correcting section corrects the defective pixel using the pixel values of the peripheral pixels in the identical polarization direction to the defective pixel. Therefore, for example, in a case where a pixel C2 indicated by a double frame is the defective pixel in FIG. 20A, the defect correcting section calculates a corrected image value using pixels C2 indicated by ○ as the peripheral pixels. For example, the defect correcting section may calculate the average value of the pixel values of the peripheral pixels and use the calculated average value as the corrected image value or may use the average value calculated by weighting according to the distances between the defective pixel and the peripheral pixels as the corrected image value.

Further, in a case where a color polarized image is generated using the polarizer with the polarization unit of 2×2 pixels and the color mosaic filter in the Bayer array, the defect correcting section corrects the defective pixel using the pixel values of the peripheral pixels that have the identical color component to the defective pixel and that are in the identical polarization direction to the defective pixel. Therefore, for example, in a case where a pixel R4 indicated by a double frame is the defective pixel in FIG. 20B, the defect correcting section uses pixels R4 indicated by ○ as the peripheral pixels and performs an arithmetic operation similar to the case of a black and white polarized image to calculate a corrected image value. Further, in a case where texture detection in the horizontal direction and the vertical direction is performed, it is sufficient if the texture detection is performed using the pixel values of the pixels indicated by ○.

3. Application Examples

The technology according to the present disclosure can be applied to various products. For example, the technology according to the present disclosure may be implemented as an apparatus to be mounted on any type of a mobile body such as an automobile, an electric vehicle, a hybrid electric vehicle, a motorcycle, a bicycle, a personal mobility, an airplane, a drone, a ship, a robot, a construction machine, and an agricultural machine (tractor).

Figure 21:
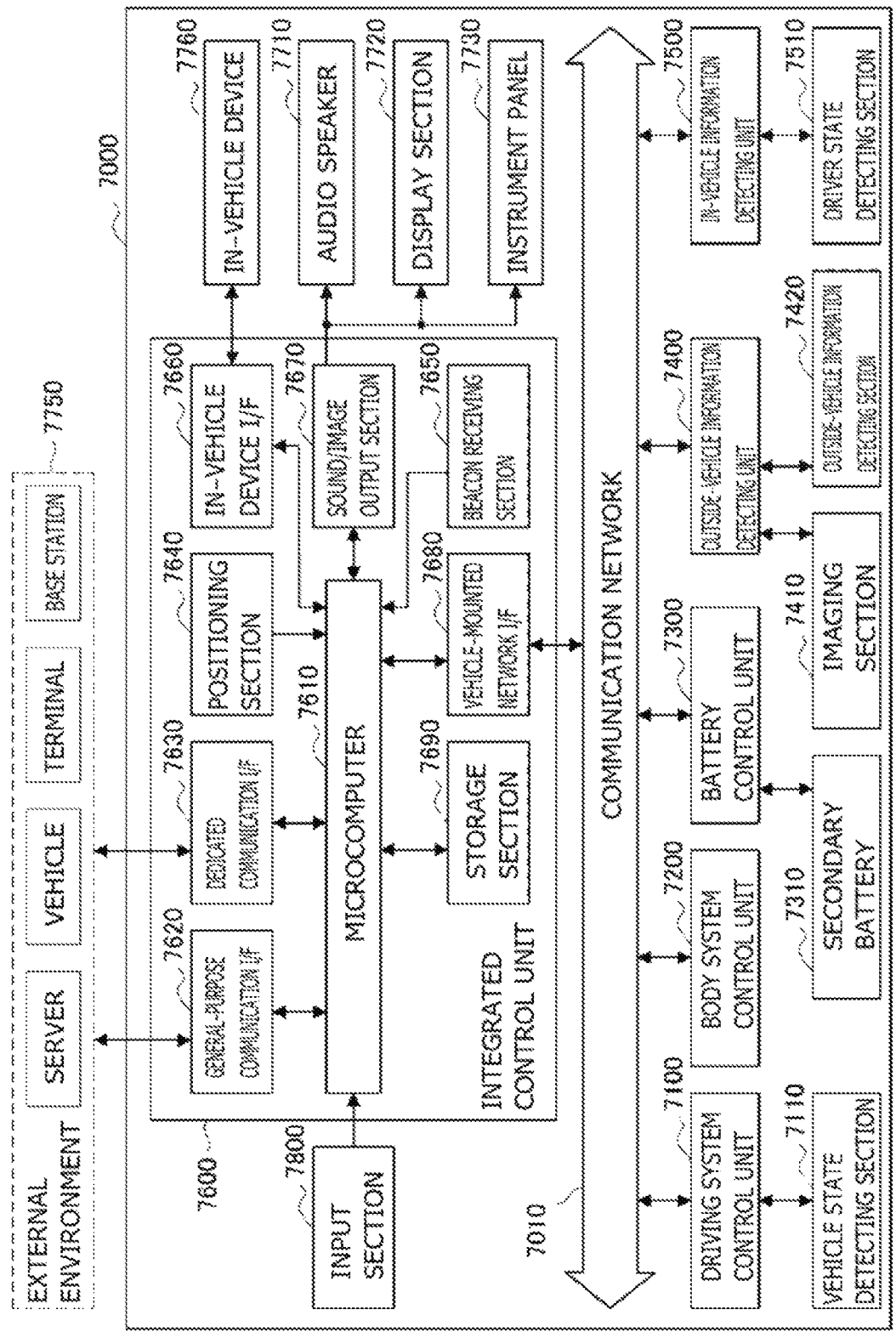
FIG. 21 is a block diagram depicting an example of schematic configuration of a vehicle control system.

FIG. 21 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 21, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 21 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 22:
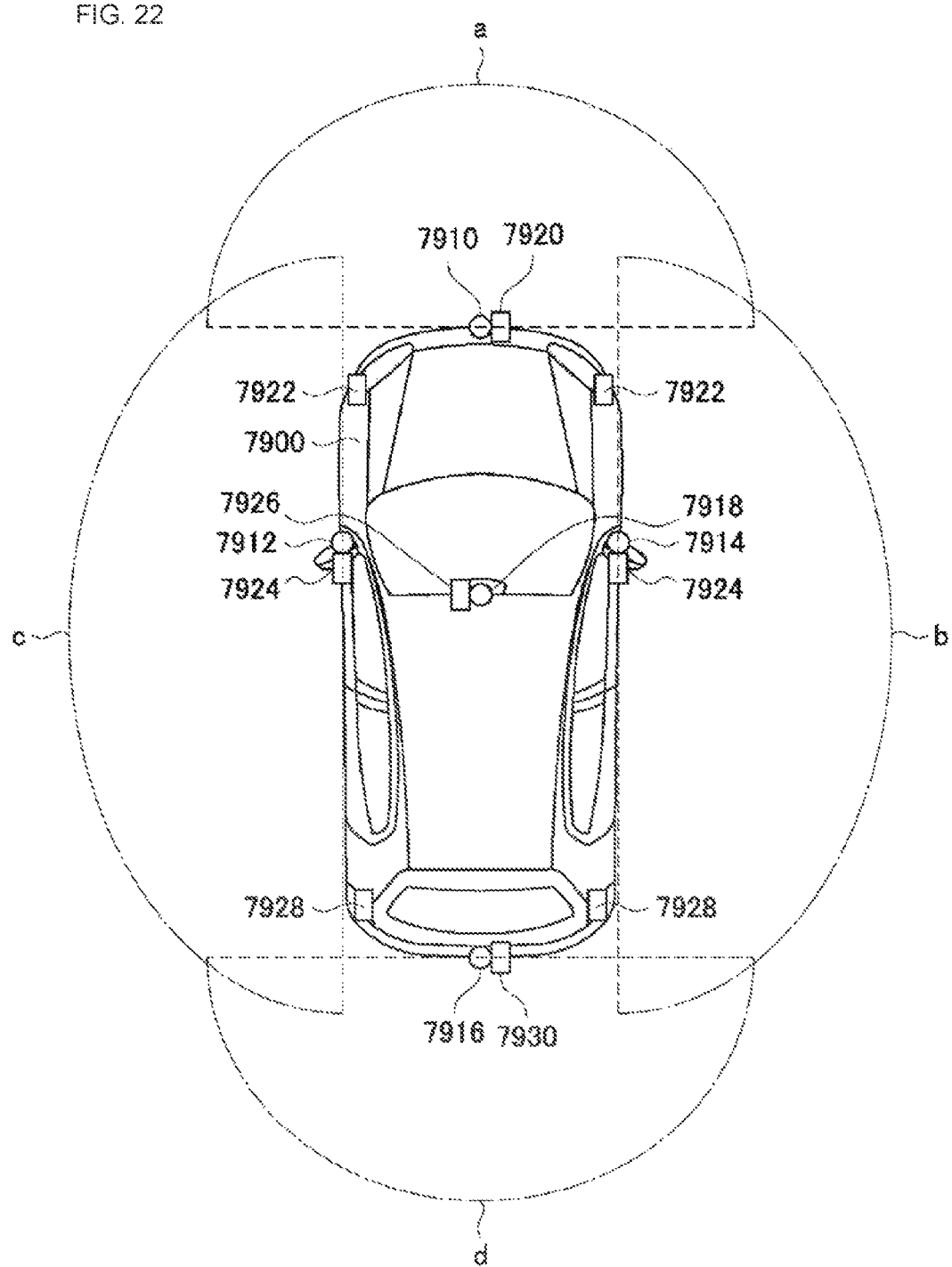
FIG. 22 is a diagram of assistance in explaining an example of installation positions of an outside-vehicle information detecting section and an imaging section.

FIG. 22 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 21, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination.

The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 21, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 21 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the imaging sections 7410, 7910, 7912, 7914, 7916, and 7918 each use the polarization imaging section 20. Further, the integrated control unit 7600 in the application example depicted in FIG. 21 includes the defect information storage section 34, the defect detecting section 35, and the defect correcting section 36. With this configuration, the imaging sections 7410, 7910, 7912, 7914, 7916, and 7918 can obtain a polarized image in which a defective pixel has been corrected. Therefore, the obtained polarized image can be used for driving support, driving control, and the like. It is noted that the defect information storage section 34 and the defect correcting section 36 may be implemented by a module (e.g., an integrated circuit module including one die) for the integrated control unit 7600 depicted in FIG. 21.

The series of the processing described in the specification can be executed by hardware, software, or in a combination thereof. In a case where the processing is to be executed by software, a program in which a process sequence has been recorded is installed in a memory of a computer incorporated into dedicated hardware and executed. Alternatively, the program can be installed and executed in a general-purpose computer capable of executing various kinds of processing.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark) (BD), a magnetic disk, and a semiconductor memory card. Such a removable recording medium can be provided as, what is called, a package software.

Further, the program may be installed from the removable recording medium into the computer, or may be wirelessly or wiredly transferred from a download site to the computer via a network such as a local area network (LAN) and the Internet. The computer can receive the program transferred in this manner and install the program into a recording medium such as a built-in hard disk.

It is noted that the effects described in the present specification are merely examples and are not limited to those examples. Additional effects that are not described may be exhibited. Further, the present technology should not be construed as limited to the embodiments of the above-described technology. The embodiments of the present technology disclose the present technology in the form of exemplification, and it is obvious that those skilled in the art can make modifications or substitutions of the embodiments without departing from the gist of the present technology. That is, the claims should be taken into consideration to determine the gist of the present technology.

Further, the image processing apparatus according to the present technology can also be configured as follows.

(1) An image processing apparatus including:
a defect detecting section configured to detect whether a target polarized pixel is a defective pixel using a pixel value of the target polarized pixel generated by a polarization imaging section and a pixel value of the target polarized pixel estimated from polarization characteristics corresponding to pixel values of peripheral pixels in a polarization direction different from a polarization direction of the target polarized pixel, the polarization imaging section being configured to obtain polarized pixels in a plurality of polarization directions.

(2) The image processing apparatus according to (1),
in which in a case where a difference between the pixel value of the target polarized pixel and the pixel value estimated is out of a predetermined allowable range, the defect detecting section determines that the target polarized pixel is the defective pixel.

(3) The image processing apparatus according to (1),
in which the peripheral pixels include a plurality of pixels in polarization directions identical to each other, and
the defect detecting section estimates the pixel value of the target polarized pixel a plurality of times in different combinations of the plurality of pixels and determines that the target polarized pixel is the defective pixel in a case where a ratio of combinations with which a difference between the pixel value of the target polarized pixel and the pixel value estimated is out of a predetermined allowable range is greater than a predetermined ratio set in advance.

(4) The image processing apparatus according to (1),
in which the defect detecting section detects whether the target polarized pixel is the defective pixel using the pixel value of the target polarized pixel and pixel values of peripheral pixels in an identical polarization direction to the target polarized pixel.

(5) The image processing apparatus according to (4),
in which in a case where a difference between the pixel value of the target polarized pixel and the pixel value estimated is out of a predetermined first allowable range and a difference between the pixel value of the target polarized pixel and the pixel values of the peripheral pixels in the identical polarization direction is out of a predetermined second allowable range, the defect detecting section determines that the target polarized pixel is the defective pixel.

(6) The image processing apparatus according to claim (4),
in which in a case where a difference between the pixel value of the target polarized pixel and the pixel value estimated is out of a predetermined first allowable range and in a case where the difference is equal to or less than the predetermined first allowable range and a difference between the pixel value of the target polarized pixel and the pixel values of the peripheral pixels in the identical polarization direction is out of a predetermined second allowable range, the defect detecting section determines that the target polarized pixel is the defective pixel.

(7) The image processing apparatus according to (1),
in which the defect detecting section includes, in the pixel values of the peripheral pixels, pixel values of peripheral pixels in a different time direction.

(8) The image processing apparatus according to (1),
in which the defect detecting section estimates the pixel value of the target polarized pixel on the basis of polarization characteristics corresponding to pixel values of peripheral pixels that include pixels having an identical color component to the target polarized pixel and that are in a polarization direction different from the polarization direction of the target polarized pixel.

(9) The image processing apparatus according to (1), including:
a white balance adjusting section configured to equalize pixel values for each color component, the pixel values being generated by imaging a white object,
in which the defect detecting section estimates the pixel value of the target polarized pixel using pixel values of peripheral pixels in a different polarization direction from the polarization direction of the target polarized pixel among pixel values of respective pixels, the pixel values being adjusted for each color component by the white balance adjusting section, the pixel values being generated by imaging the white object.

(10) The image processing apparatus according to (1),
in which the peripheral pixels include pixels in at least two or more polarization directions different from the polarization direction of the target polarized pixel.

(11) The image processing apparatus according to (1),
in which the peripheral pixels include non-polarized pixels and pixels in one polarization direction different from the polarization direction of the target polarized pixel.

(12) The image processing apparatus according to (11),
in which an angle difference between the polarization direction of the target polarized pixel and the polarization direction of the peripheral pixels is within a predetermined range based on 45°.

(13) The image processing apparatus according to any one of (1) to (12), including:
a defect information storage section configured to store defect information indicating the defective pixel,
in which the defect detecting section updates the defect information on a basis of a result of defect detection of the target polarized pixel, the defect information being stored in the defect information storage section.

(14) The image processing apparatus according to any one of (1) to (13), further including:
a defect correcting section configured to specify, as a corrected pixel value of the defective pixel, a pixel value estimated on the basis of the polarization characteristics corresponding to the pixel values of the peripheral pixels in the polarization direction different from a polarization direction of the defective pixel.

(15) The image processing apparatus according to any one of (1) to (13), further including:
a defect correcting section configured to specify, as a pixel value of the defective pixel, an average value of pixel values of peripheral pixels in a polarization direction identical to a polarization direction of the defective pixel.

(16) The image processing apparatus according to (15),
in which the defect correcting section calculates a corrected pixel value of the defective pixel using pixel values of peripheral pixels determined to be in a polarization direction identical to the polarization direction of the defective pixel and to have a texture identical to a texture of the defective pixel.

INDUSTRIAL APPLICABILITY

With an image processing apparatus and an image processing method according to the present technology, a defect detecting section is configured to detect whether a target polarized pixel is a defective pixel using a pixel value of the target polarized pixel generated by a polarization imaging section and a pixel value of the target polarized pixel estimated from polarization characteristics corresponding to pixel values of peripheral pixels in a polarization direction different from a polarization direction of the target polarized pixel. The polarization imaging section is configured to obtain polarized pixels in a plurality of polarization directions. Therefore, it is possible to detect a defect of a pixel in the polarization imaging section that generates a polarized image, allowing application to, for example, a device that recognizes a three-dimensional shape and the like.

REFERENCE SIGNS LIST

10 Polarized image system
20 Polarization imaging section
30 Image processing section
31 Past image storage section
32 White balance adjusting section
34 Defect information storage section
35 Defect detecting section
36 Defect correcting section
201 Image sensor
202 Polarizer
203 Color filter

The invention claimed is:

1. An image processing apparatus, comprising:
circuitry configured to:
   obtain polarized pixels in a plurality of polarization directions, wherein the polarized pixels include a first pixel value of a target polarized pixel; and
   detect whether the target polarized pixel is a defective pixel based on the first pixel value of the target polarized pixel and a second pixel value of the target polarized pixel estimated from polarization characteristics corresponding to pixel values of peripheral pixels, around the target polarized pixel, in a polarization direction different from a polarization direction of the target polarized pixel, wherein
   based on a difference between the first pixel value of the target polarized pixel and the estimated second pixel value that is out of an allowable range, the target polarized pixel is determined as the defective pixel.

2. The image processing apparatus according to claim 1, wherein
the peripheral pixels include a plurality of pixels in polarization directions identical to each other, and
the circuitry is further configured to:
   estimate the second pixel value of the target polarized pixel a plurality of times in different combinations of the plurality of pixels; and
   determine that the target polarized pixel is the defective pixel based on a ratio of combinations with which the difference between the first pixel value of the target polarized pixel and the estimated second pixel value is out of the allowable range is greater than a determined ratio set in advance.

3. The image processing apparatus according to claim 1, wherein
the circuitry is further configured to detect that the target polarized pixel is the defective pixel based on the first pixel value of the target polarized pixel and the pixel values of the peripheral pixels in an identical polarization direction to the target polarized pixel.

4. The image processing apparatus according to claim 3, wherein
based on the difference between the first pixel value of the target polarized pixel and the estimated second pixel value that is out of a first allowable range and a difference between the first pixel value of the target polarized pixel and the pixel values of the peripheral pixels in the identical polarization direction that is out of a second allowable range, the circuitry is further configured to determine that the target polarized pixel is the defective pixel.

5. The image processing apparatus according to claim 3, wherein
based on the difference between the first pixel value of the target polarized pixel and the estimated second pixel value that is out of a first allowable range and based on the difference that is within the first allowable range and a difference between the first pixel value of the target polarized pixel and the pixel values of the peripheral pixels in the identical polarization direction is out of a second allowable range, the circuitry is further configured to determine that the target polarized pixel is the defective pixel.

6. The image processing apparatus according to claim 1, wherein
the pixel values of the peripheral pixels include pixel values of peripheral pixels in a past image frame.

7. The image processing apparatus according to claim 1, wherein
the circuitry is further configured to estimate the second pixel value of the target polarized pixel based on the polarization characteristics corresponding to the pixel values of the peripheral pixels that include pixels having an identical color component to the target polarized pixel and pixels that are in a polarization direction different from the polarization direction of the target polarized pixel.

8. The image processing apparatus according to claim 1, wherein the circuitry is further configured to:
equalize pixel values for each color component, wherein the pixel values for each color component are generated based on an imaged white object; and
estimate the second pixel value of the target polarized pixel based on the pixel values of the peripheral pixels in a different polarization direction from the polarization direction of the target polarized pixel among the pixel values of respective pixels, wherein
   the pixel values are adjusted for each color component, and
   the pixel values are generated based on the imaged white object.

9. The image processing apparatus according to claim 1, wherein the peripheral pixels include pixels in at least two or more polarization directions different from the polarization direction of the target polarized pixel.

10. The image processing apparatus according to claim 1, wherein the peripheral pixels include non-polarized pixels and pixels in one polarization direction different from the polarization direction of the target polarized pixel.

11. The image processing apparatus according to claim 10, wherein an angle difference between the polarization direction of the target polarized pixel and the polarization direction of the peripheral pixels is within a range based on 45°.

12. The image processing apparatus according to claim 1, further comprising:
    a defect information storage section configured to store defect information indicating the defective pixel, wherein
    the circuitry is further configured to update the defect information based on a result of defect detection of the target polarized pixel, and
    the defect information is stored in the defect information storage section.

13. The image processing apparatus according to claim 1, wherein the circuitry is further configured to:
    specify, as a corrected pixel value of the defective pixel, a pixel value estimated based on the polarization characteristics corresponding to the pixel values of the peripheral pixels in the polarization direction different from a polarization direction of the defective pixel.

14. The image processing apparatus according to claim 1, wherein the circuitry is further configured to:
    specify, as a pixel value of the defective pixel, an average value of the pixel values of the peripheral pixels in a polarization direction identical to a polarization direction of the defective pixel.

15. The image processing apparatus according to claim 14, wherein the circuitry is further configured to calculate a corrected pixel value of the defective pixel based on the pixel values of the peripheral pixels determined to be in the polarization direction identical to the polarization direction of the defective pixel and to have a texture identical to a texture of the defective pixel.

16. An image processing method, comprising:
    detecting, by circuitry, whether a target polarized pixel is a defective pixel based on a first pixel value of the target polarized pixel and a second pixel value of the target polarized pixel estimated from polarization characteristics corresponding to pixel values of peripheral pixels, around the target polarized pixel, in a polarization direction different from a polarization direction of the target polarized pixel, wherein
    polarized pixels are in a plurality of polarization directions, and
    based on a difference between the first pixel value of the target polarized pixel and the estimated second pixel value that is out of an allowable range, the target polarized pixel is determined as the defective pixel.

* * * * *